United States Patent
Yamada

(10) Patent No.: US 12,013,553 B2
(45) Date of Patent: Jun. 18, 2024

(54) AERIAL IMAGE DISPLAY SYSTEM AND INPUT SYSTEM

(71) Applicant: FUJIFILM Corporation, Tokyo (JP)

(72) Inventor: Naoyoshi Yamada, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/309,129

(22) Filed: Apr. 28, 2023

(65) Prior Publication Data
US 2023/0273452 A1  Aug. 31, 2023

Related U.S. Application Data

(63) Continuation of application No. PCT/JP2021/037825, filed on Oct. 13, 2021.

(30) Foreign Application Priority Data

Oct. 29, 2020  (JP) ................ 2020-181461

(51) Int. Cl.
*G06F 3/042* (2006.01)
*G02B 27/28* (2006.01)
(Continued)

(52) U.S. Cl.
CPC .......... *G02B 30/56* (2020.01); *G02B 27/283* (2013.01); *G02B 5/09* (2013.01); *G02B 5/122* (2013.01);
(Continued)

(58) Field of Classification Search
CPC ........ G02B 30/56; G02B 27/283; G02B 5/09; G02B 5/122; G06F 3/0421; G06F 3/044; G06F 2203/04108
See application file for complete search history.

(56) References Cited

U.S. PATENT DOCUMENTS 4,670,744 A * 6/1987 Buzak ................. G02B 30/24
  349/1
6,449,089 B1 * 9/2002 Moshrefzadeh ..... G03B 21/604
  359/454

(Continued)

FOREIGN PATENT DOCUMENTS

JP   6-59217 A    3/1994
JP   11-237584 A  8/1999
(Continued)

OTHER PUBLICATIONS

International Preliminary Report on Patentability and English translation of the Written Opinion of the International Searching Authority for International Application No. PCT/JP2021/037825, dated May 11, 2023.

(Continued)

*Primary Examiner* — Michael J Jansen, II

(74) *Attorney, Agent, or Firm* — Birch, Stewart, Kolasch & Birch, LLP

(57) ABSTRACT

Provided are a thin aerial image display system that can display an aerial image and an input device capable of a touch operation on a video displayed in the air without touch on a screen. The aerial image display system includes a reflective polarizer and a half mirror, in which the half mirror is any one of a concave mirror, a Fresnel mirror, or a retroreflective member of a semi-transmissive and semi-reflective type.

15 Claims, 14 Drawing Sheets

(51) Int. Cl.
    *G02B 30/56*         (2020.01)
    *G06F 3/044*         (2006.01)
    *G02B 5/09*          (2006.01)
    *G02B 5/122*        (2006.01)

(52) U.S. Cl.
    CPC ............ *G06F 3/0421* (2013.01); *G06F 3/044* (2013.01); *G06F 2203/04108* (2013.01)

(56) References Cited

U.S. PATENT DOCUMENTS

| | | | |
|---|---|---|---|
| 9,989,776 B2* | 6/2018 | Numata | G02B 30/25 |
| 10,302,986 B2* | 5/2019 | Koito | G02B 5/3083 |
| 10,782,783 B2* | 9/2020 | Hayashi | G06F 3/165 |
| 11,294,198 B2* | 4/2022 | Yamada | G02B 30/56 |
| 2004/0125284 A1* | 7/2004 | Lee | G09G 3/3637 |
| | | | 349/113 |
| 2007/0041096 A1* | 2/2007 | Nieuwkerk | G02B 5/08 |
| | | | 359/485.05 |
| 2016/0178964 A1* | 6/2016 | Sakai | G02F 1/133536 |
| | | | 345/592 |
| 2017/0184844 A1 | 6/2017 | Matsushita | |
| 2017/0261759 A1* | 9/2017 | Yamamoto | G02B 5/3083 |
| 2017/0285359 A1* | 10/2017 | Numata | G02B 5/3058 |
| 2018/0031878 A1* | 2/2018 | Koito | G02B 5/124 |
| 2018/0136730 A1* | 5/2018 | Hayashi | G06F 3/165 |
| 2018/0188550 A1* | 7/2018 | Frayne | G02B 30/56 |
| 2018/0284469 A1* | 10/2018 | Koito | G02F 1/133553 |
| 2019/0018248 A1 | 1/2019 | Nishiyama et al. | |
| 2019/0179062 A1 | 6/2019 | Nawata et al. | |
| 2019/0243147 A1 | 8/2019 | Smithwick et al. | |
| 2019/0369409 A1* | 12/2019 | Yamada | G02B 30/56 |
| 2020/0033618 A1* | 1/2020 | Li | G02B 5/124 |
| 2021/0373205 A1* | 12/2021 | Hornstein | G02B 30/27 |

FOREIGN PATENT DOCUMENTS

| | | |
|---|---|---|
| JP | 2017-116726 A | 6/2017 |
| JP | 2018-92135 A | 6/2018 |
| WO | WO 2018/150773 A1 | 8/2018 |

OTHER PUBLICATIONS

International Search Report for International Application No. PCT/JP2021/037825, dated Dec. 28, 2021, with English translation.

\* cited by examiner

AERIAL IMAGE DISPLAY SYSTEM AND INPUT SYSTEM

CROSS-REFERENCE TO RELATED APPLICATIONS

This application is a Continuation of PCT International Application No. PCT/JP2021/037825 filed on Oct. 13, 2021, which claims priority under 35 U.S.C. § 119(a) to Japanese Patent Application No. 2020-181461 filed on Oct. 29, 2020. The above applications are hereby expressly incorporated by reference, in its entirety, into the present application.

BACKGROUND OF THE INVENTION

1. Field of the Invention

The present invention relates to an aerial image display system and an input system including the aerial image display system.

2. Description of the Related Art

Recently, an aerial image display apparatus that displays an image in the air where no screen is present is disclosed, and utilization thereof as an input device capable of a touch operation on a video displayed in the air without touch on a display or screen for sales promotion having a high eye-catching effect is expected.

The input device capable of a touch operation on a video displayed in the air does not require touch on a screen and is preferable from a hygienic point of view. Therefore, utilization as an input device that is touched by many and unspecified persons or as an input device that is used in a medical setting is expected. In addition, the aerial image is inconspicuous from sides other than the front. Therefore, for example, in an automated teller machine (ATM), an effect of preventing peeking from the surroundings during input of passwords is expected.

For example, JP2018-092135A describes an optical imaging apparatus that forms a real image of a subject to be projected, the optical image formation apparatus including: a polarizer that allows transmission of P polarized light of a polarizing axis parallel to a reference direction and reflects S polarized light of the polarizing axis perpendicular to the reference direction; a first retardation element that converts the S polarized light into circularly polarized light or elliptically polarized light; a mirror that reflects the light transmitted through the first retardation element; a second retardation element that converts the P polarized light reflected from the mirror and transmitted through the first retardation element and the polarizer into circularly polarized light or elliptically polarized light; and a retroreflection plate retroreflects the light transmitted through the second retardation element.

In the optical imaging apparatus described in JP2018-092135A, light from the subject to be projected (light projection means) is converted into S polarized light to be incident into the polarizer, the S polarized light reflected from the polarizer is reflected from the mirror. The light is converted into P polarized light, transmits through the polarizer, and is reflected from the retroreflection plate. The light is converted into S polarized light and is reflected from the polarizer to the visible side. As a result, an image of the subject to be projected is displayed in the air.

SUMMARY OF THE INVENTION

In this optical imaging apparatus, the polarizer needs to be disposed non-parallel to the mirror and the retroreflection plate (refer to FIG. 2 and the like of JP2018-092135A). Therefore, there is a problem in that the size of the apparatus increases.

An object of the present invention is to provide a thin aerial image display system that can display an aerial image and an input device capable of a touch operation on a video displayed in the air without touch on a screen.

In order to achieve the object, the present invention has the following configurations.

[1] An aerial image display system comprising:
a reflective polarizer; and
a half mirror,
in which the half mirror is any one of a concave mirror, a Fresnel mirror, or a retroreflective member of a semi-transmissive and semi-reflective type.

[2] The aerial image display system according to [1], further comprising:
an image display apparatus,
in which the reflective polarizer and the half mirror are disposed on a visible side of the image display apparatus.

[3] The aerial image display system according to [2], further comprising:
a polarization separating element that has a function of separating incident light into polarized light components orthogonal to each other.

[4] The aerial image display system according to [3],
in which the polarization separating element includes any one of an active retardation layer that is capable of switching a direction of a slow axis or a size of retardation, a patterned retardation layer that includes a plurality of two kinds of regions different in at least one of a direction of a slow axis or a size of retardation, an active polarizer that is capable of switching a direction of a transmission axis or an absorption axis, or a patterned polarizer that includes a plurality of two kinds of regions having different directions of transmission axes or absorption axes.

[5] The aerial image display system according to [3] or [4],
in which the reflective polarizer is a reflective linear polarizer,
the aerial image display system further comprises a retardation plate, and
the image display apparatus, the polarization separating element, the half mirror, the retardation plate, and the reflective polarizer are disposed in this order.

[6] The aerial image display system according to [3] or [4],
in which the reflective polarizer is a reflective circular polarizer, and
the image display apparatus, the polarization separating element, the half mirror, and the reflective polarizer are disposed in this order.

[7] The aerial image display system according to [3] or [4],
in which the reflective polarizer is a reflective linear polarizer,
the aerial image display system further comprises an absorptive linear polarizer and a retardation plate, and
the image display apparatus, the absorptive linear polarizer, the retardation plate, the half mirror, the polarization separating element, and the reflective polarizer are disposed in this order.

[8] The aerial image display system according to [3] or [4], in which the reflective polarizer is a reflective linear polarizer, the aerial image display system further comprises an absorptive linear polarizer and a retardation plate, and the image display apparatus, the absorptive linear polarizer, the reflective polarizer, the retardation plate, the half mirror, and the polarization separating element are disposed in this order.

[9] The aerial image display system according to [3] or [4], in which the reflective polarizer is a reflective circular polarizer, the aerial image display system further comprises an absorptive linear polarizer and a retardation plate, and the image display apparatus, the absorptive linear polarizer, the retardation plate, the reflective polarizer, the half mirror, and the polarization separating element are disposed in this order.

[10] The aerial image display system according to [3] or [4], in which the reflective polarizer is a reflective linear polarizer, the aerial image display system further comprises an absorptive linear polarizer, and the image display apparatus, the absorptive linear polarizer, the reflective polarizer, the polarization separating element, and the half mirror are disposed in this order.

[11] The aerial image display system according to [2], in which the reflective polarizer is a reflective linear polarizer, the aerial image display system further comprises an absorptive linear polarizer and two retardation plates, and in which the image display apparatus, the absorptive linear polarizer, the retardation plate, the half mirror, the retardation plate, and the reflective polarizer are disposed in this order.

[12] The aerial image display system according to [2], in which the reflective polarizer is a reflective circular polarizer, the aerial image display system further comprises an absorptive linear polarizer and a retardation plate, and the image display apparatus, the absorptive linear polarizer, the retardation plate, the half mirror, and the reflective polarizer are disposed in this order.

[13] The aerial image display system according to [2], in which the reflective polarizer is a reflective linear polarizer, the aerial image display system further comprises an absorptive linear polarizer and a retardation plate, and the image display apparatus, the absorptive linear polarizer, the reflective polarizer, the retardation plate, and the half mirror are disposed in this order.

[14] The aerial image display system according to [2], in which the reflective polarizer is a reflective circular polarizer, the aerial image display system further comprises an absorptive linear polarizer and a retardation plate, and the image display apparatus, the absorptive linear polarizer, the retardation plate, the reflective polarizer, and the half mirror are disposed in this order.

[15] The aerial image display system according to any one of [5], [7], and [11], further comprising an absorptive linear polarizer that is provided on a visible side further than the reflective polarizer.

[16] The aerial image display system according to any one of [6], [10], and [12] to [14], further comprising an absorptive circular polarizer that is provided on a visible side.

[17] The aerial image display system according to any one of [1] to [16], in which the half mirror includes a support and a reflecting surface disposed on a surface of the support, a coating layer having the same refractive index as the support is disposed on the reflecting surface, and a surface of the support opposite to the reflecting surface and a surface of the coating layer opposite to the reflecting surface are flat surfaces parallel to each other.

[18] An input system comprising:

the aerial image display system according to any one of [1] to [17]; and a noncontact touch sensor.

According to the present invention, it is possible to provide a thin aerial image display system that can display an aerial image and an input device capable of a touch operation on a video displayed in the air without touch on a screen.

DESCRIPTION OF THE PREFERRED EMBODIMENTS

Hereinafter, the details of the present invention will be described. The following description regarding components has been made based on a representative embodiment of the present invention. However, the present invention is not limited to the embodiment. In the present specification, numerical ranges represented by "to" include numerical values before and after "to" as lower limit values and upper limit values. In addition, "orthogonal" or "parallel" regarding an angle represents a range of the exact angle ±10°, and "the same" and "different" regarding angles can be determined based on whether or not a difference between the angles is less than 5°.

In the present specification, "slow axis" represents a direction in which a refractive index in a plane is the maximum.

In addition, visible light refers to light having a wavelength which can be observed by human eyes among electromagnetic waves and refers to light in a wavelength range of 380 to 780 nm.

Aerial Image Display System

An aerial image display system according to an embodiment of the present invention comprises:
a reflective polarizer; and
a half mirror,
in which the half mirror is any one of a concave mirror, a Fresnel mirror, or a retroreflective member of a semi-transmissive and semi-reflective type.

Figure 1:
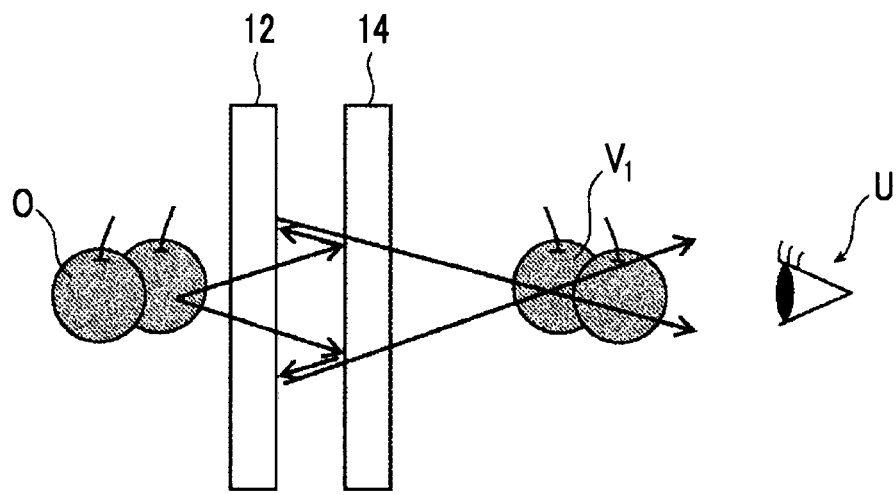
FIG. 1 is a diagram conceptually showing an example of an aerial image display system according to the present invention.

FIG. 1 is a diagram conceptually showing the aerial image display system according to the embodiment of the present invention.

An aerial image display system 10a shown in FIG. 1 includes a half mirror 12 and a reflective polarizer 14.

The half mirror 12 is a semi-transmissive and semi-reflective half mirror that reflects a part of incident light and allows transmission of the remaining light. In addition, in the present invention, the half mirror 12 is any one of a concave mirror, a Fresnel mirror, or a retroreflective member. The half mirror 12 has an action of focusing reflected light in the air.

The reflective polarizer 14 allows transmission of light having one polarization state in incident light and reflects polarized light orthogonal to the polarized light. Here, the polarized light components orthogonal to each other are polarized light components positioned on opposite sides of the Poincare sphere, for example, the north pole and the south pole of the Poincare sphere. Specifically, the polarized light components orthogonal to each other are right circularly polarized light and left circularly polarized light in terms of circularly polarized light and are linearly polarized light components orthogonal to each other in terms of linearly polarized light. The reflective polarizer 14 may be a reflective linear polarizer or may be a reflective circular polarizer.

An action of the aerial image display system 10a will be described.

In the example shown in FIG. 1, the aerial image display system 10a is disposed between an object O and a user U such that the half mirror 12 side is disposed toward the object O.

In a case where the object O is irradiated with light, the light is reflected from a surface of the object O. In this case, as shown in FIG. 1, light is emitted from each of points on the object O toward various directions. A part of reflected light transmits through the half mirror 12. The light transmitted through the half mirror 12 is incident into the reflective polarizer 14. In a case where the reflective polarizer 14 is a reflective circular polarizer, a circularly polarized light component to be reflected from the reflective polarizer 14 in the incident light is reflected from the reflective polarizer 14. Since the reflection from the reflective polarizer 14 is specular reflection, the light is reflected to further spread.

The circularly polarized light reflected from the reflective polarizer 14 is incident into the half mirror 12 again. A part of the incident light is reflected from the half mirror 12. In this case, for example, in a case where the half mirror 12 is a retroreflective member, a traveling direction of the light reflected from the half mirror 12 is parallel and opposite to a direction from the reflective polarizer 14 toward the half mirror 12. Therefore, the light reflected from the half mirror 12 is collected. In addition, the circularly polarized light reflected from the half mirror 12 is converted into circularly polarized light having an opposite turning direction. Accordingly, the circularly polarized light reflected from the half mirror 12 transmits through the reflective polarizer 14, is collected, and is focused in the air.

This way, the light from the object O that is positioned on the depth side further than the aerial image display system 10a in a view from the user U is focused by the aerial image display system 10a on a space in front of the aerial image display system 10a. As a result, an aerial image $V_1$ of the object O can be displayed on the space in front of the aerial image display system 10a. The aerial image $V_1$ is a real image that is focused in the air.

In the example shown in FIG. 1, in the aerial image display system 10a, the half mirror 12 is disposed on the object O side, and the reflective polarizer 14 is disposed on the user U side. However, the present invention is not limited to this example, the reflective polarizer 14 may be disposed on the object O side, and the half mirror 12 may be disposed on the user U side.

In this configuration, the polarized light component transmitted through the reflective polarizer 14 in the light from the object O is reflected from the half mirror 12. In this case, the polarized light component is converted into polarized light having a polarization state orthogonal thereto. Therefore, the polarized light reflected from the half mirror 12 is reflected from the reflective polarizer 14. A part of the light reflected from the reflective polarizer 14 transmits through the half mirror 12. In addition, the light reflected from the half mirror 12 is collected. Therefore, the light is focused on the space in front of the aerial image display system 10a, and the aerial image $V_1$ of the object O can be displayed.

Here, in the example shown in FIG. 1, the aerial image display system 10a displays the aerial image $V_1$ of the object O disposed at the depth of the aerial image display system 10a. However, the present invention is not limited to this configuration.

Figure 2:
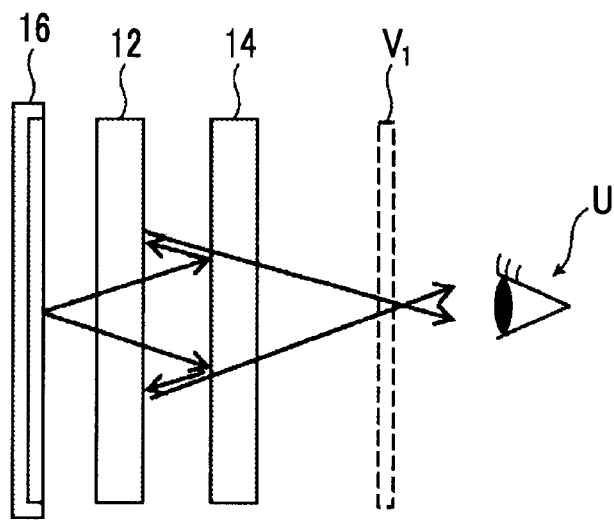
FIG. 2 is a diagram conceptually showing another example of the aerial image display system according to the present invention.

FIG. 2 illustrates another example of the aerial image display system according to the embodiment of the present invention.

In an aerial image display system 10b shown in FIG. 2, an image display apparatus 16, the half mirror 12, and the reflective polarizer 14 are disposed in this order.

The image display apparatus 16 is a well-known image display apparatus (display). Examples of the image display apparatus include a liquid crystal display device, an organic electroluminescent display device, a light emitting diode (LED) display device, and a micro LED display device. In addition, in a case where the aerial image is a still image, the image display apparatus may be a photograph with a backlight, a printed material, or the like. In the following description, the organic electroluminescent display device will also be referred to as "OLED". OLED is an abbreviation for "Organic Light Emitting Diode".

The half mirror 12 and the reflective polarizer 14 are disposed on a visible side of the image display apparatus 16. The half mirror 12 and the reflective polarizer 14 are as described above.

An action of the aerial image display system 10b will be described.

The image display apparatus 16 emits light that forms an image. In this case, as shown in FIG. 2, light is emitted from each of points (each of pixels) on the image display apparatus toward various directions. The light emitted from the image display apparatus 16 is incident into the half mirror 12, and a part of the incident light transmits through the half mirror 12. The light transmitted through the half mirror 12 is incident into the reflective polarizer 14. In a case where the reflective polarizer 14 is a reflective circular polarizer, a circularly polarized light component to be reflected from the reflective polarizer 14 in the incident light is reflected from the reflective polarizer 14. Since the reflection from the reflective polarizer 14 is specular reflection, the light is reflected to further spread.

The circularly polarized light reflected from the reflective polarizer 14 is incident into the half mirror 12 again. A part of the incident light is reflected from the half mirror 12. In this case, for example, in a case where the half mirror 12 is a retroreflective member, a traveling direction of the light reflected from the half mirror 12 is parallel and opposite to a direction from the reflective polarizer 14 toward the half mirror 12. Therefore, the light reflected from the half mirror 12 is collected. In addition, the circularly polarized light reflected from the half mirror 12 is converted into circularly polarized light having an opposite turning direction. Accordingly, the circularly polarized light reflected from the half mirror 12 transmits through the reflective polarizer 14, is collected, and is focused in the air.

This way, in the aerial image display system 10b, the light emitted from the image display apparatus 16 is focused on a space on the reflective polarizer 14 side (downstream side) of the aerial image display system 10b. As a result, the aerial image $V_1$ of the image displayed by the image display apparatus 16 can be displayed on the space on the downstream side of the aerial image display system 10b.

In the present invention, the downstream side is a downstream side in an optical path of an image displayed (emitted) from the image display apparatus 16.

In addition, in the example shown in FIG. 2, in the light transmitted through the half mirror 12 and incident into the reflective polarizer 14, the circularly polarized light component that is not reflected from the reflective polarizer 14 transmits through the reflective polarizer 14 and is emitted from the aerial image display system 10b. The image formed by the light is recognized by the user U as a real image (hereinafter, referred to as "non-floating image") that does not float in the air.

That is, in the example shown in FIG. 2, the same image displayed by the image display apparatus 16 is displayed as the non-floating image and the aerial image.

In the example shown in FIG. 2, in the aerial image display system 10b, the half mirror 12 and the reflective polarizer 14 are disposed in this order from the image display apparatus 16 side. However, the present invention is not limited to this example, and the reflective polarizer 14 and the half mirror 12 may be disposed in this order from the image display apparatus 16 side.

In this configuration, the polarized light component transmitted through the reflective polarizer 14 in the light from the image display apparatus 16 is reflected from the half mirror 12. In this case, the polarized light component is converted into polarized light having a polarization state orthogonal thereto. Therefore, the polarized light reflected from the half mirror 12 is reflected from the reflective polarizer 14. A part of the light reflected from the reflective polarizer 14 transmits through the half mirror 12. In addition, the light reflected from the half mirror 12 is collected. As a result, by focusing the light on the space on the downstream side of the aerial image display system 10b, the aerial image $V_1$ of the image displayed by the image display apparatus 16 can be displayed.

Here, the aerial image display system according to the embodiment of the present invention may further include a polarization separating element that has a function of separating incident light into polarized light components orthogonal to each other.

Figure 3:
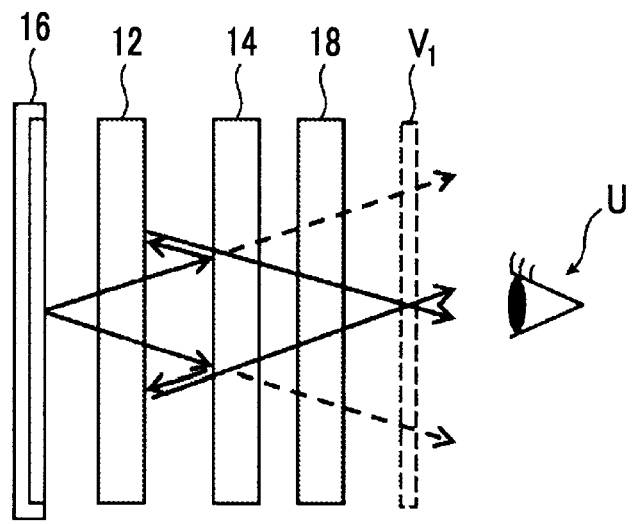
FIG. 3 is a diagram conceptually showing another example of the aerial image display system according to the present invention.

FIG. 3 is a diagram conceptually showing another example of the aerial image display system according to the present invention.

In an aerial image display system 10c shown in FIG. 3, the image display apparatus 16, the half mirror 12, the reflective polarizer 14, and a polarization separating element 18 are disposed in this order.

The polarization separating element 18 is an element that separates at least a part of the incident light into polarized light components orthogonal to each other. Here, the polarized light components orthogonal to each other are polarized light components positioned on opposite sides of the Poincare sphere, for example, the north pole and the south pole of the Poincare sphere. Specifically, the polarized light components having opposite properties are right circularly polarized light and left circularly polarized light in terms of circularly polarized light and are linearly polarized light components orthogonal to each other in terms of linearly polarized light.

The half mirror 12, the reflective polarizer 14, and the polarization separating element 18 are disposed on the visible side of the image display apparatus 16. The half mirror 12 and the reflective polarizer 14 are as described above.

This aerial image display system 10c displays two kinds of images as multiple images to be superimposed.

Among the two kinds of images, one image R is not reflected from the half mirror 12 and the reflective polarizer 14, transmits through all of the half mirror 12, the reflective polarizer 14, and the polarization separating element 18, and is observed by the user U (refer to an arrow of a broken line in FIG. 3). That is, the image R is an image that is displayed by the image display apparatus 16 and is directly observed by the user U. Hereinafter, for convenience of description, this image R will also be referred to as "non-floating image R".

Another image $V_1$ transmits through the half mirror 12, is selectively reflected from the reflective polarizer 14, is reflected from the half mirror 12, transmits through the reflective polarizer 14, and is observed by the user U. That is, the image $V_1$ has an optical path that reciprocates between the half mirror 12 and the reflective polarizer 14 (refer to an arrow of a solid line in FIG. 3). Hereinafter, for convenience of description, this image $V_1$ will also be referred to as the aerial image $V_1$. The optical path of the aerial image $V_1$ in the aerial image display system 10c is the same as the optical path of the aerial image $V_1$ in the aerial image display system 10b shown in FIG. 2.

Although described below, the optical paths of the non-floating image R and the aerial image $V_1$ are divided by the separation of the polarized light by the polarization separating element 18.

Figure 4:
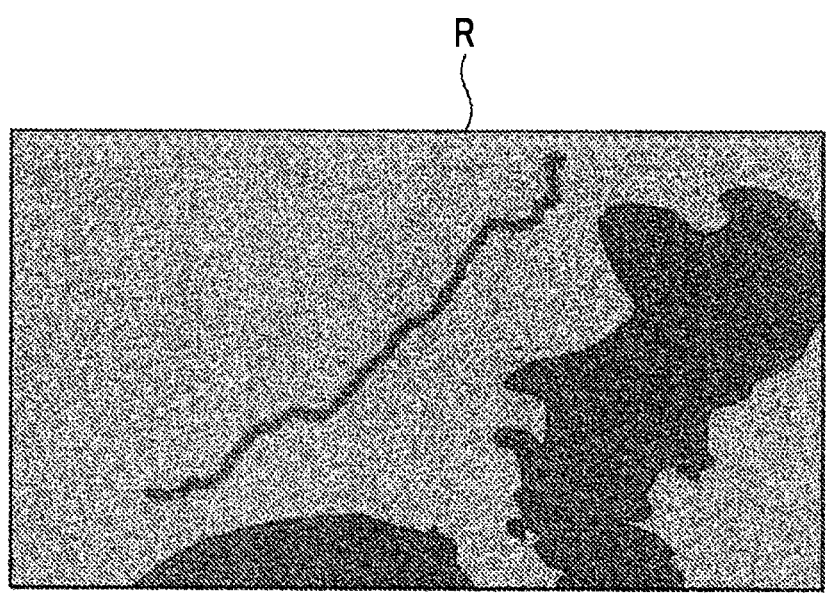
FIG. 4 is a diagram showing one example of a non-floating image that is displayed by the aerial image display system according to the present invention.
Figure 5:
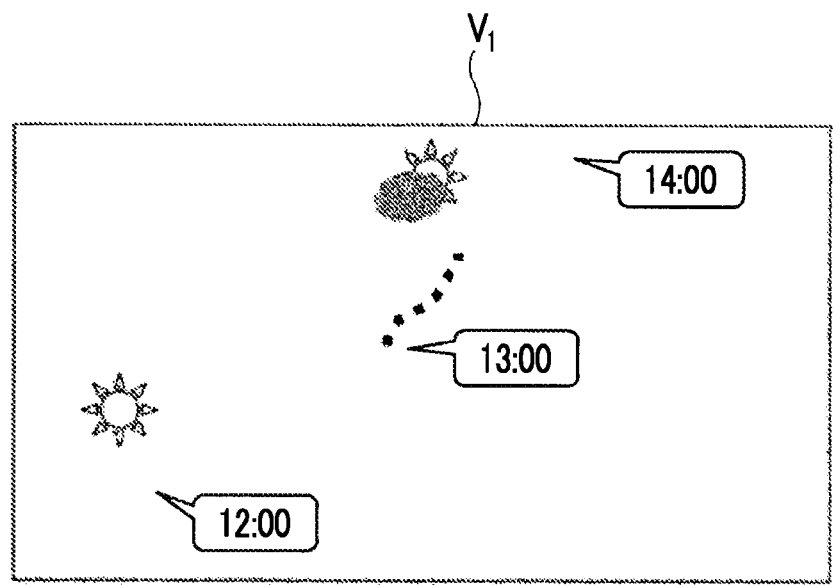
FIG. 5 is a diagram showing one example of an aerial image that is displayed by the aerial image display system according to the present invention.
Figure 6:
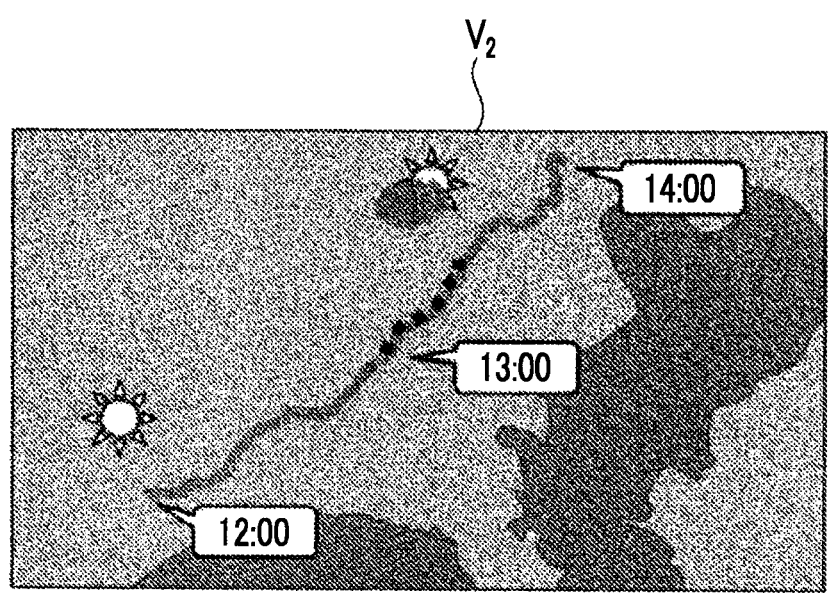
FIG. 6 is a diagram conceptually showing a superimposed image that is displayed by the aerial image display system according to the present invention.

FIGS. 4 to 6 shown examples of images displayed by the aerial image display system 10c. FIG. 4 shows an example of the non-floating image R displayed by the aerial image display system 10c. FIG. 5 shows an example of the aerial image $V_1$ displayed by the aerial image display system 10c. FIG. 6 shows an example of a superimposed image $V_2$ displayed by the aerial image display system 10c. As shown in FIG. 6, the aerial image display system 10c superimposes the non-floating image R and the aerial image $V_1$ on each other to display the superimposed image.

In a case where the superimposed image $V_2$ is observed by the user U, among the non-floating image R and the aerial image $V_1$ that are superimposed, the aerial image $V_1$ is observed to be positioned on the front side. In other words, in the superimposed image $V_2$ observed by the user U, the aerial image $V_1$ is observed to float from the non-floating image R.

For example, for use in a car navigation system, for example, as conceptually shown in FIGS. 4 to 6, the aerial image display system according to the embodiment of the present invention displays a map image for the non-floating image R and displays position information and additional information such as weather or arrival time as the aerial image $V_1$. In this case, the user U recognizes that the additional information floats in front of the map image.

As a result, in the observed superimposed image, the user U can recognize the map image and the additional information at a glance, and can accurately and rapidly necessary information for the user U.

Here, in the aerial image display system 10c, the image display apparatus 16 alternately displays the image for the non-floating image R and the image for the aerial image $V_1$ by time-division. Alternatively, the image display apparatus 16 alternately arranges and displays the image for the non-floating image R and the image for the aerial image $V_1$, for example, by space-division in a stripe shape.

In a case where the image display apparatus 16 performs the display by time-division, the polarization separating element 18 separates incident light into polarized light components orthogonal to each other by performing polarization conversion or absorption temporally alternately on the incident light. In a case where the image display apparatus 16 performs the display by space-division, the polarization separating element 18 separates incident light into polarized light components orthogonal to each other by performing polarization conversion or absorption spatially alternately, for example, in a stripe shape on the incident light.

In a case where the aerial image display system 10c performs the display by time-division, at a timing at which the non-floating image R is displayed, the polarization separating element 18 operates such that the polarized light that transmits through the half mirror 12 and the reflective polarizer 14 without being reflected from the half mirror 12 and the reflective polarizer 14 is finally emitted to the visible side, and the polarized light that is reflected and reciprocates once between the half mirror 12 and the reflective polarizer 14 is finally absorbed or reflected not to be emitted to the visible side. On the other hand, at a timing where the aerial image $V_1$ is displayed, the polarization separating element 18 operates such that the polarized light that is reflected and reciprocates once between the half mirror 12 and the reflective polarizer 14 is emitted to the visible side without being reflected from the half mirror 12 and the reflective polarizer 14, and the polarized light that transmits through the half mirror 12 and the reflective polarizer 14 is absorbed or reflected not to be emitted to the visible side.

In addition, in a case where the aerial image display system 10c performs the display by space-division, at a position at which the non-floating image R is displayed, the polarization separating element 18 operates such that the polarized light that transmits through the half mirror 12 and the reflective polarizer 14 without being reflected from the half mirror 12 and the reflective polarizer 14 is finally emitted to the visible side, and the polarized light that is reflected and reciprocates once between the half mirror 12 and the reflective polarizer 14 is finally absorbed or reflected not to be emitted to the visible side. On the other hand, at a position where the aerial image $V_1$ is displayed, the polarization separating element 18 operates such that the polarized light that is reflected and reciprocates once between the half mirror 12 and the reflective polarizer 14 is emitted to the visible side, and the polarized light that transmits through the half mirror 12 and the reflective polarizer 14 without being reflected from the half mirror 12 and the reflective polarizer 14 is absorbed or reflected not to be emitted to the visible side.

As a result, in the aerial image display system 10c, the image for displaying the non-floating image R can be prevented from being displayed as the aerial image, the image to be displayed as the aerial image $V_1$ can be prevented from being displayed as the non-floating image, and the superimposed image where the image for the non-floating image R can be appropriately recognized as the non-floating image R and the image for the aerial image $V_1$ can be appropriately recognized as the aerial image $V_1$ can be displayed.

In the example shown in FIG. 3, the polarization separating element 18 is disposed on the visible side further than the reflective polarizer 14, but the present invention is not limited thereto. The polarization separating element 18 may be disposed between the image display apparatus 16 and the half mirror 12. Alternatively, the polarization separating element 18 may be disposed between the half mirror 12 and the reflective polarizer 14.

In addition, in the example shown in FIG. 3, in the aerial image display system 10c, the half mirror 12 and the reflective polarizer 14 are disposed in this order from the image display apparatus 16 side. However, the present invention is not limited to this example, and the reflective polarizer 14 and the half mirror 12 may be disposed in this order from the image display apparatus 16 side.

Hereinafter, a specific configuration of the aerial image display system according to the embodiment of the present invention will be described in more detail.

First, the aerial image display system that displays an aerial image shown in FIG. 2 will be described.

Figure 7:
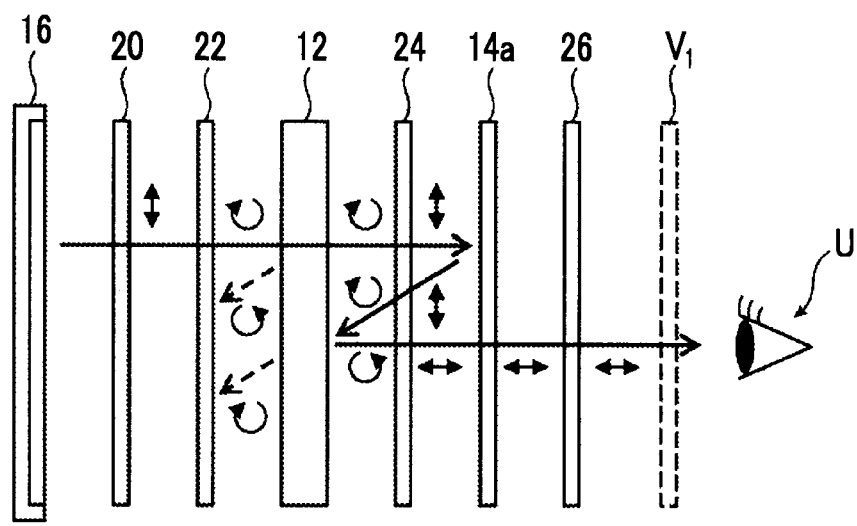
FIG. 7 is a diagram conceptually showing another example of the aerial image display system according to the present invention.

FIG. 7 is a diagram conceptually showing another example of the aerial image display system according to the present invention.

An aerial image display system 10d shown in FIG. 7 includes the image display apparatus 16, an absorptive linear polarizer 20, a retardation layer 22, the half mirror 12, a retardation layer 24, and a reflective linear polarizer 14a. In addition, as a preferable aspect, the aerial image display system 10d includes an absorptive linear polarizer 26 that is provided on the visible side further than the reflective linear polarizer 14a.

That is, the aerial image display system 10d includes, as the reflective polarizer 14, the reflective linear polarizer 14a that allows transmission of linearly polarized light that vibrates in one direction and reflects linearly polarized light in a direction orthogonal to the direction.

The absorptive linear polarizer 20 and the absorptive linear polarizer 26 are well-known absorptive linearly polarizing plates.

In addition, the retardation layer 22 and the retardation layer 24 are well-known retardation layers. As described below the retardation layer converts linearly polarized light into circularly polarized light or converts circularly polarized light into linearly polarized light, and thus is basically a ¼ wave plate.

An action of the aerial image display system 10d will be described.

The image display apparatus 16 emits light for an image (aerial image). In this case, as described above, light is emitted from each of points (each of pixels) on the image display apparatus toward various directions. The light emitted from the image display apparatus 16 transmits through the absorptive linear polarizer 20 to be converted into linearly polarized light in one direction. In the example shown in the drawing, for example, the absorptive linear polarizer 20 allows transmission of linearly polarized light in an up-down direction in the drawing. Next, this linearly polarized light transmits through the retardation layer 22 to be converted into circularly polarized light. In the example shown in the drawing, for example, the retardation layer 22 converts the linearly polarized light in the up-down direction into right circularly polarized light.

In a case where the right circularly polarized light is incident into the half mirror 12, a part of the light is reflected to be converted into left circularly polarized light, and is incident into the retardation layer 22 to be converted into linearly polarized light in a direction orthogonal to the up-down direction (direction perpendicular to the paper plane). This linearly polarized light is linearly polarized light in a direction where the light does not transmit through the absorptive linear polarizer 20, and thus is absorbed by the absorptive linear polarizer 20.

On the other hand, the remaining light of the right circularly polarized light incident into the half mirror 12 transmits through the half mirror 12 and transmits through the retardation layer 24. In this case, the light is converted into linearly polarized light by the retardation layer 24. In the example shown in the drawing, for example, the retardation layer 24 converts the right circularly polarized light into linearly polarized light in the up-down direction.

The linearly polarized light transmitted through the retardation layer 24 is incident into the reflective linear polarizer 14a. In the example shown in the drawing, the reflective linear polarizer 14a reflects the linearly polarized light in the up-down direction. Therefore, the linearly polarized light incident into the reflective linear polarizer 14a is reflected to be incident into the retardation layer 24. The linearly polarized light in the up-down direction incident into the retardation layer 24 is converted into right circularly polarized light.

This right circularly polarized light is incident into the half mirror 12, and a part of the incident light is reflected. In this case, the right circularly polarized light is converted into left circularly polarized light by reflection. In addition, the half mirror 12 is any one of a concave mirror, a Fresnel mirror, or a retroreflective member, and thus reflects light to collect the light.

On the other hand, the remaining light of the right circularly polarized light incident into the half mirror 12 transmits through the half mirror 12. The right circularly polarized light transmitted through the half mirror 12 is converted into linearly polarized light by the retardation layer 22, transmits through the absorptive linear polarizer 20, and is absorbed by the surface or the like of the image display apparatus 16.

The left circularly polarized light reflected from the half mirror 12 is incident into the retardation layer 24 to be converted into linearly polarized light in a direction orthogonal to the up-down direction (a direction perpendicular to the paper plane; in the drawing, for convenience of description, indicated by an arrow in the left-right direction; in the following description, also referred to as linearly polarized light in a left-right direction).

This linearly polarized light is a linearly polarized light in a direction orthogonal to that of the linearly polarized light reflected from the reflective linear polarizer 14a, and thus transmits through the reflective linear polarizer 14a. The linearly polarized light transmitted through the reflective linear polarizer 14a is incident into the absorptive linear polarizer 26. The absorptive linear polarizer 26 allows transmission of linearly polarized light in the same direction as that of the linearly polarized light transmitted through the reflective linear polarizer 14a. Accordingly, in the example shown in the drawing, the absorptive linear polarizer 26 allows transmission of the linearly polarized light in the left-right direction in the drawing.

As described above, in the aerial image display system 10d, only the light of the optical path for the aerial image $V_1$ is emitted to the user U side, and the image displayed by the image display apparatus 16 is prevented from being recognized as the non-floating image. As a result, the image displayed by the image display apparatus 16 can be displayed as the aerial image $V_1$.

In addition, as a preferable aspect, the aerial image display system 10d includes the absorptive linear polarizer 26 that is provided on the visible side further than the reflective linear polarizer 14a. By including the absorptive linear polarizer 26, stray light such as the linearly polarized light component in the up-down direction that is not completely reflected from the reflective linear polarizer 14a can be absorbed by the absorptive linear polarizer 26, and recognition of an unnecessary image caused by the stray light can be more reliably suppressed. In addition, external light is reflected from the surface of the aerial image display system 10d, and so-called glittering can be prevented.

In addition, in a preferable aspect, in the aerial image display system 10d, an absorption axis of the absorptive linear polarizer 20 and an absorption axis of the absorptive linear polarizer 26 are orthogonal to each other. In addition, a transmission axis of the reflective linear polarizer 14a and a transmission axis of the absorptive linear polarizer 26 are parallel to each other. Further, a slow axis of the retardation layer 22 and a slow axis of the retardation layer 24 are orthogonal to each other.

With the above-described configuration, stray light such as the linearly polarized light component in the up-down direction that is not completely reflected from the reflective linear polarizer 14a can be further reduced, which is preferable. However, the present invention is not limited to the above-described configuration, and, for example, an aspect where the absorption axis of the absorptive linear polarizer 20 and the absorption axis of the absorptive linear polarizer 26 are parallel to each other can also be adopted.

In addition, in the aerial image display system 10d, it is preferable that a size of retardation of the retardation layer 22 and a size of retardation of the retardation layer 24 match with each other. In addition, it is preferable that wavelength dispersibility of the retardation layer 22 and wavelength dispersibility of the retardation layer 24 match with each other, and it is more preferable that both of the wavelength dispersibility of the retardation layer 22 and the wavelength dispersibility of the retardation layer 24 are reverse dispersibility. Here, the reverse dispersibility refers to a property in which, as the wavelength increases, a value of retardation at the wavelength increases.

With the above-described configuration, stray light such as the linearly polarized light component in the up-down direction that is not completely reflected from the reflective linear polarizer 14a can be further reduced, which is preferable.

In addition, in the aerial image display system 10d, it is preferable that the respective members adhere to each other such that an air layer is not present between the respective members. In a case where the air layer is present, unnecessary reflection at an air interface between the respective members may occur, reflection of polarized light that is originally not to be reflected from the reflective polarizer may occur, or stray light may be caused. For example, in the aerial image display system 10d, in a case where the right circularly polarized light that is incident into the half mirror 12 again, transmits through the half mirror 12, and travels toward the image display apparatus 16 is reflected from the surface of the retardation layer 22, the reflected light is converted into left circularly polarized light. Next, the left circularly polarized light transmits through the half mirror 12, the reflective linear polarizer 14a, and the absorptive linear polarizer 26, and is recognized by the user U as an unnecessary image.

In addition, due to the same reason, in the aerial image display system 10d, in a case where the air layer is present between the respective members, it is preferable to perform an antireflection treatment on the air-side surface of the member. For the antireflection treatment, various well-known methods such as a method bonding an AR film where a thin film having a specific refractive index and a specific film thickness or a method of bonding a moth eye film can be used.

Figure 8:
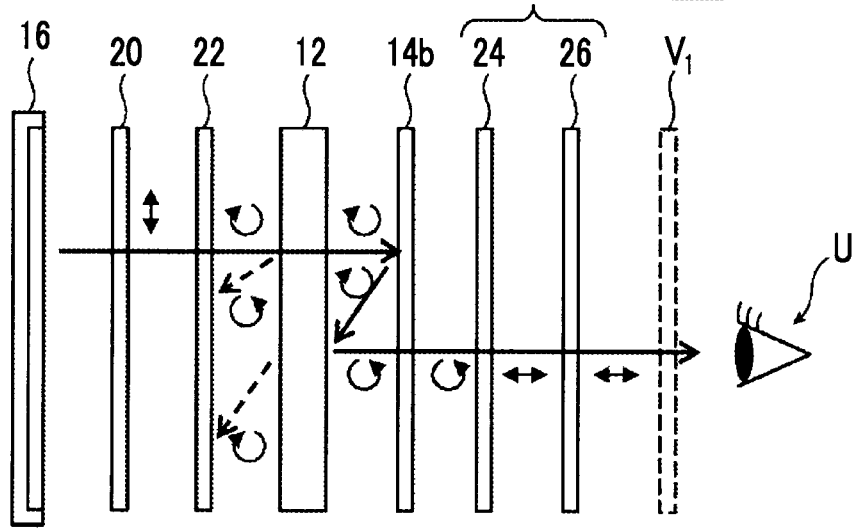
FIG. 8 is a diagram conceptually showing another example of the aerial image display system according to the present invention.

As described above, regarding the reduction in reflection between the respective members, the same can be applied to each of aspects of FIG. 8 and subsequent drawings.

FIG. 8 is a diagram conceptually showing another example of the aerial image display system according to the present invention.

An aerial image display system 10e shown in FIG. 8 includes the image display apparatus 16, the absorptive linear polarizer 20, the retardation layer 22, the half mirror 12, and a reflective circular polarizer 14b.

That is, the aerial image display system 10e includes, as the reflective polarizer 14, a reflective circular polarizer 14b that allows transmission of circularly polarized light having one turning direction and reflects circularly polarized light having another turning direction.

In addition, as a preferable aspect, the aerial image display system 10e includes an absorptive circular polarizer 32 that is provided on the visible side further than the reflective circular polarizer 14b. In the example shown in the drawing, the absorptive circular polarizer 32 includes the retardation layer 24 and the absorptive linear polarizer 26.

An action of the aerial image display system 10e will be described.

The image display apparatus 16 emits light for an image (aerial image). In this case, as described above, light is emitted from each of points (each of pixels) on the image display apparatus toward various directions. The light emitted from the image display apparatus 16 transmits through the absorptive linear polarizer 20 to be converted into linearly polarized light in one direction. In the example shown in the drawing, for example, the absorptive linear polarizer 20 allows transmission of linearly polarized light in an up-down direction in the drawing. Next, this linearly polarized light transmits through the retardation layer 22 to be converted into circularly polarized light. In the example shown in the drawing, for example, the retardation layer 22 converts the linearly polarized light in the up-down direction into right circularly polarized light.

In a case where the right circularly polarized light is incident into the half mirror 12, a part of the light is reflected to be converted into left circularly polarized light, and is incident into the retardation layer 22 to be converted into linearly polarized light in a direction orthogonal to the up-down direction (direction perpendicular to the paper plane). This linearly polarized light is linearly polarized light in a direction where the light does not transmit through the absorptive linear polarizer 20, and thus is absorbed by the absorptive linear polarizer 20.

On the other hand, the remaining light of the right circularly polarized light incident into the half mirror 12 transmits through the half mirror 12 and is incident into the reflective circular polarizer 14b. In the example shown in the drawing, the reflective circular polarizer 14b reflects right circularly polarized light. Therefore, the right circularly polarized light incident into the reflective circular polarizer 14b is reflected to be incident into the half mirror 12.

A part of the light incident into the half mirror 12 is reflected. In this case, the right circularly polarized light is converted into left circularly polarized light by reflection. In addition, the half mirror 12 is any one of a concave mirror, a Fresnel mirror, or a retroreflective member, and thus reflects light to collect the light.

On the other hand, the remaining light of the right circularly polarized light incident into the half mirror 12 transmits through the half mirror 12. The right circularly polarized light transmitted through the half mirror 12 is converted into linearly polarized light by the retardation layer 22, transmits through the absorptive linear polarizer 20, and is absorbed by the surface or the like of the image display apparatus 16.

The left circularly polarized light reflected from the half mirror 12 is incident into the reflective circular polarizer 14b. The reflective circular polarizer 14b reflects right circularly polarized light, and thus allows transmission of left circularly polarized light. The left circularly polarized light transmitted through the reflective circular polarizer 14b is incident into the absorptive circular polarizer 32. The absorptive circular polarizer 32 allows transmission of circularly polarized light having the same turning direction as circularly polarized light that transmits through the reflective circular polarizer 14b while converting the circularly polarized light into linearly polarized light. Accordingly, in the example shown in the drawing, the absorptive circular polarizer 32 allows transmission of left circularly polarized light. Specifically, the left circularly polarized light transmitted through the reflective circular polarizer 14b is incident into the retardation layer 24. The retardation layer 24 converts the incident left circularly polarized light into linearly polarized light in the left-right direction. The linearly polarized light transmitted through the retardation layer 24 is incident into the absorptive linear polarizer 26. The absorptive linear polarizer 26 allows transmission of the linearly polarized light in the left-right direction. As a result, the absorptive circular polarizer 32 allows transmission of circularly polarized light having the same turning direction as circularly polarized light that transmits through the reflective circular polarizer 14b while converting the circularly polarized light into linearly polarized light.

As described above, in the aerial image display system 10e, only the light of the optical path for the aerial image $V_1$ is emitted to the user U side, and the image displayed by the image display apparatus 16 is prevented from being recognized as the non-floating image. As a result, the image displayed by the image display apparatus 16 can be displayed as the aerial image $V_1$.

In addition, as a preferable aspect, the aerial image display system 10e includes the absorptive circular polarizer 32 that is provided on the visible side further than the reflective circular polarizer 14b. By including the absorptive circular polarizer 32, stray light such as the right circularly polarized light component that is not completely reflected from the reflective circular polarizer 14b can be absorbed by the absorptive circular polarizer 32, and recognition of an unnecessary image caused by the stray light can be more reliably suppressed. In addition, external light is reflected from the surface of the aerial image display system 10e, and so-called glittering can be prevented.

Here, in the aerial image display system 10e, it is preferable that the retardation layer 22 has reverse dispersibility. In a case where the retardation layer 22 has reverse dispersibility, the light incident into the reflective circular polarizer 14b is converted into more ideal circularly polarized light, and stray light can be further reduced, which is preferable.

Due to the same reason it is also preferable that the retardation layer 24 has reverse dispersibility.

Figure 9:
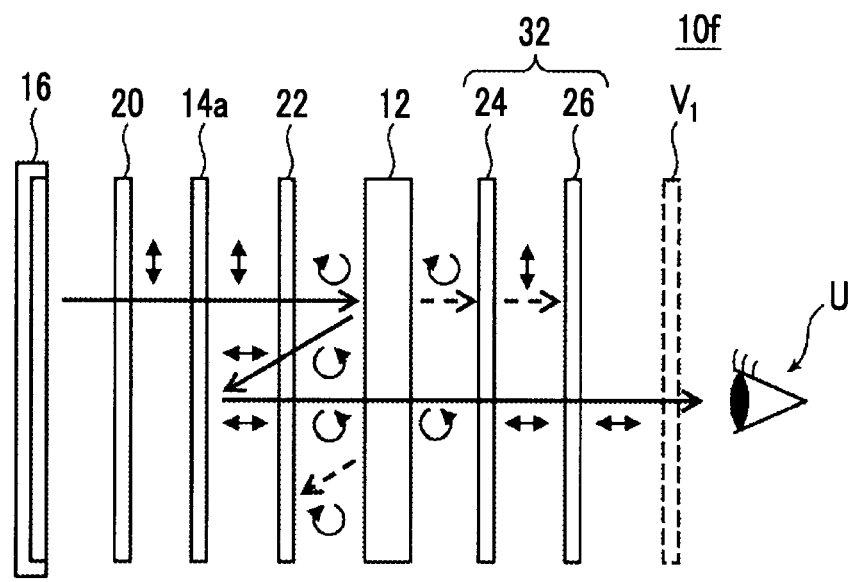
FIG. 9 is a diagram conceptually showing another example of the aerial image display system according to the present invention.

FIG. 9 is a diagram conceptually showing another example of the aerial image display system according to the present invention.

An aerial image display system 10f shown in FIG. 9 includes the image display apparatus 16, the absorptive linear polarizer 20, the reflective linear polarizer 14a, the retardation layer 22, and the half mirror 12. In addition, as a preferable aspect, the aerial image display system 10f includes the absorptive circular polarizer 32 that is provided on the visible side further than the half mirror 12.

That is, the aerial image display system 10f includes, as the reflective polarizer 14, the reflective linear polarizer 14a that allows transmission of linearly polarized light that vibrates in one direction and reflects linearly polarized light in a direction orthogonal to the direction.

An action of the aerial image display system 10f will be described.

The image display apparatus 16 emits light for an image (aerial image). In this case, as described above, light is emitted from each of points (each of pixels) on the image display apparatus toward various directions. The light emitted from the image display apparatus 16 transmits through the absorptive linear polarizer 20 to be converted into linearly polarized light in one direction. In the example shown in the drawing, for example, the absorptive linear polarizer 20 allows transmission of linearly polarized light in an up-down direction in the drawing. Next, the linearly polarized light is incident into the reflective linear polarizer 14a. In the example shown in the drawing, the reflective linear polarizer 14a allows transmission of the linearly polarized light in the up-down direction. Therefore, the linearly polarized light incident into the reflective linear polarizer 14a transmits through the reflective linear polarizer 14a to be incident into the retardation layer 22 without being reflected. The retardation layer 22 converts the incident linearly polarized light into circularly polarized light. In the example shown in the drawing, for example, the retardation layer 22 converts the linearly polarized light in the up-down direction into right circularly polarized light.

This right circularly polarized light is incident into the half mirror 12, and a part of the incident light transmits through the half mirror 12. The right circularly polarized light transmitted through the half mirror 12 is incident into the absorptive circular polarizer 32. In the example shown in the drawing, the absorptive circular polarizer 32 absorbs right circularly polarized light. Therefore, the right circularly polarized light incident into the absorptive circular polarizer 32 is absorbed. Specifically, the absorptive circular polarizer 32 includes the retardation layer 24 and the absorptive linear polarizer 26, and the right circularly polarized light transmitted through the half mirror 12 is converted into linearly polarized light in the up-down direction by the retardation layer 24. The absorptive linear polarizer 26 absorbs the linearly polarized light in the up-down direction.

Therefore, the linearly polarized light in the up-down direction is absorbed by the absorptive linear polarizer 26.

On the other hand, the remaining light of the right circularly polarized light incident into the half mirror 12 is reflected from the half mirror 12. In this case, the right circularly polarized light is converted into left circularly polarized light by reflection. In addition, the half mirror 12 is any one of a concave mirror, a Fresnel mirror, or a retroreflective member, and thus reflects light to collect the light.

The left circularly polarized light reflected from the half mirror 12 is incident into the retardation layer 22 to be converted into linearly polarized light in the left-right direction. The linearly polarized light is incident into the reflective linear polarizer 14a. In the example shown in the drawing, the reflective linear polarizer 14a reflects the linearly polarized light in the left-right direction. Therefore, the linearly polarized light incident into the reflective linear polarizer 14a is reflected. The linearly polarized light reflected from the reflective linear polarizer 14a is incident into the retardation layer 22, is converted into left circularly polarized light, and is incident into the half mirror 12.

A part of the left circularly polarized light incident into the half mirror 12 is reflected to be converted into right circularly polarized light, and is incident into the retardation layer 22 to be converted into linearly polarized light in the up-down direction. The linearly polarized light transmits through the reflective linear polarizer 14a, transmits through the absorptive linear polarizer 20, and is absorbed by the surface or the like of the image display apparatus 16.

On the other hand, a part of the left circularly polarized light incident into the half mirror 12 transmits through the half mirror 12. The left circularly polarized light transmitted through the half mirror 12 is incident into the absorptive circular polarizer 32. The absorptive circular polarizer 32 absorbs right circularly polarized light, and thus allows transmission of left circularly polarized light. In the example shown in the drawing, the absorptive circular polarizer 32 includes the retardation layer 24 and the absorptive linear polarizer 26, and the left circularly polarized light transmitted through the half mirror 12 is converted into linearly polarized light in the left-right direction by the retardation layer 24. The absorptive linear polarizer 26 absorbs the linearly polarized light in the up-down direction. Therefore, the linearly polarized light in the left-right direction transmits through the absorptive linear polarizer 26.

As described above, in the aerial image display system 10f, only the light of the optical path for the aerial image V₁ is emitted to the user U side, and the image displayed by the image display apparatus 16 is prevented from being recognized as the non-floating image. As a result, the image displayed by the image display apparatus 16 can be displayed as the aerial image $V_1$.

In addition, as a preferable aspect, the aerial image display system 10f includes the absorptive circular polarizer 32 that is provided on the visible side further than the half mirror 12. By including the absorptive circular polarizer 32, stray light such as the right circularly polarized light component that is completely reflected from the half mirror 12 can be absorbed by the absorptive circular polarizer 32, and recognition of an unnecessary image caused by the stray light can be more reliably suppressed. In addition, external light is reflected from the surface of the aerial image display system 10e, and so-called glittering can be prevented.

In addition, in a preferable aspect, in the aerial image display system 10f, the absorption axis of the absorptive linear polarizer 20 and the absorption axis of the absorptive linear polarizer 26 are orthogonal to each other. In addition, the transmission axis of the reflective linear polarizer 14a and a transmission axis of the absorptive linear polarizer 20 are parallel to each other. Further, the slow axis of the retardation layer 22 and the slow axis of the retardation layer 24 are orthogonal to each other.

In addition, it is preferable that the retardation of the retardation layer 22 and the retardation of the retardation layer 24 match with each other. In addition, it is preferable that wavelength dispersibility of the retardation layer 22 and wavelength dispersibility of the retardation layer 24 match with each other, and it is more preferable that both of the wavelength dispersibility of the retardation layer 22 and the wavelength dispersibility of the retardation layer 24 are reverse dispersibility.

With the above-described configuration, stray light such as the right circularly polarized light component that is not reflected from the half mirror 12 can be further reduced, which is preferable.

Figure 10:
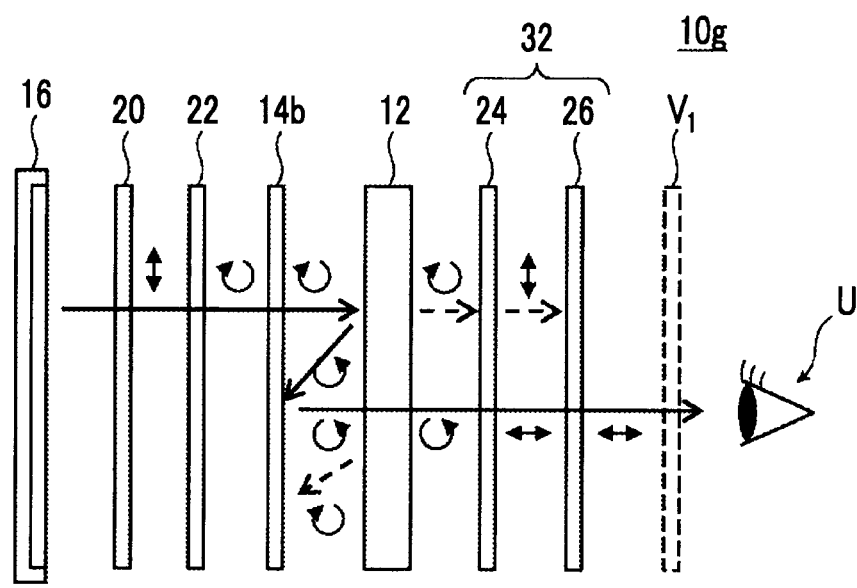
FIG. 10 is a diagram conceptually showing another example of the aerial image display system according to the present invention.

FIG. 10 is a diagram conceptually showing another example of the aerial image display system according to the present invention.

An aerial image display system 10g shown in FIG. 10 includes the image display apparatus 16, the absorptive linear polarizer 20, the retardation layer 22, the reflective circular polarizer 14b, and the half mirror 12. In addition, as a preferable aspect, the aerial image display system 10g includes the absorptive circular polarizer 32 that is provided on the visible side further than the half mirror 12.

That is, the aerial image display system 10g includes, as the reflective polarizer 14, the reflective circular polarizer 14b that allows transmission of circularly polarized light having one turning direction and reflects circularly polarized light having another turning direction.

An action of the aerial image display system 10g will be described.

The image display apparatus 16 emits light for an image (aerial image). In this case, as described above, light is emitted from each of points (each of pixels) on the image display apparatus toward various directions. The light emitted from the image display apparatus 16 transmits through the absorptive linear polarizer 20 to be converted into linearly polarized light in one direction. In the example shown in the drawing, for example, the absorptive linear polarizer 20 allows transmission of linearly polarized light in an up-down direction in the drawing. Next, this linearly polarized light is incident into the retardation layer 22. The retardation layer 22 converts the incident linearly polarized light into circularly polarized light. In the example shown in the drawing, for example, the retardation layer 22 converts the linearly polarized light in the up-down direction into right circularly polarized light.

The right circularly polarized light is incident into the reflective circular polarizer 14b. In the example shown in the drawing, the reflective circular polarizer 14b allows transmission of right circularly polarized light. Therefore, the right circularly polarized light incident into the reflective circular polarizer 14b transmits through the reflective circular polarizer 14b to be incident into the half mirror 12 without being reflected.

This right circularly polarized light is incident into the half mirror 12, and a part of the incident light transmits through the half mirror 12. The right circularly polarized light transmitted through the half mirror 12 is incident into the absorptive circular polarizer 32. In the example shown in the drawing, the absorptive circular polarizer 32 absorbs right circularly polarized light. Therefore, the right circularly polarized light incident into the absorptive circular polarizer 32 is absorbed. Specifically, the absorptive circular polarizer 32 includes the retardation layer 24 and the absorptive linear polarizer 26, and the right circularly polarized light transmitted through the half mirror 12 is converted into linearly polarized light in the up-down direction by the retardation layer 24. The absorptive linear polarizer 26 absorbs the linearly polarized light in the up-down direction. Therefore, the linearly polarized light in the up-down direction is absorbed by the absorptive linear polarizer 26.

On the other hand, the remaining light of the right circularly polarized light incident into the half mirror 12 is reflected from the half mirror 12. In this case, the right circularly polarized light is converted into left circularly polarized light by reflection. In addition, the half mirror 12 is any one of a concave mirror, a Fresnel mirror, or a retroreflective member, and thus reflects light to collect the light.

The left circularly polarized light reflected from the half mirror 12 is incident into the reflective circular polarizer 14b. In the example shown in the drawing, the reflective circular polarizer 14b allows transmission of right circularly polarized light. Therefore, the left circularly polarized light incident into the reflective circular polarizer 14b is reflected. The left circularly polarized light reflected from the reflective circular polarizer 14b is incident into the half mirror 12.

A part of the left circularly polarized light incident into the half mirror 12 is reflected to be converted into right circularly polarized light, transmits through the reflective circular polarizer 14b, and is incident into the retardation layer 22 to be converted into linearly polarized light in the up-down direction. This linearly polarized light transmits through the absorptive linear polarizer 20, and is absorbed by the surface or the like of the image display apparatus 16.

On the other hand, the remaining left circularly polarized light incident into the half mirror 12 transmits through the half mirror 12. The left circularly polarized light transmitted through the half mirror 12 is incident into the absorptive circular polarizer 32. The absorptive circular polarizer 32 absorbs right circularly polarized light, and thus allows transmission of left circularly polarized light. In the example shown in the drawing, the absorptive circular polarizer 32 includes the retardation layer 24 and the absorptive linear polarizer 26, and the left circularly polarized light transmitted through the half mirror 12 is converted into linearly polarized light in the left-right direction by the retardation layer 24. The absorptive linear polarizer 26 absorbs the linearly polarized light in the up-down direction. Therefore, the linearly polarized light in the left-right direction transmits through the absorptive linear polarizer 26.

As described above, in the aerial image display system 10g, only the light of the optical path for the aerial image $V_1$ is emitted to the user U side, and the image displayed by the image display apparatus 16 is prevented from being recognized as the non-floating image. As a result, the image displayed by the image display apparatus 16 can be displayed as the aerial image $V_1$.

In addition, as a preferable aspect, the aerial image display system 10g includes the absorptive circular polarizer 32 that is provided on the visible side further than the half mirror 12. By including the absorptive circular polarizer 32, stray light such as the right circularly polarized light component that is completely reflected from the half mirror 12 can be absorbed by the absorptive circular polarizer 32, and recognition of an unnecessary image caused by the stray light can be more reliably suppressed. In addition, external light is reflected from the surface of the aerial image display system 10g, and so-called glittering can be prevented.

Here, in the aerial image display system 10g, it is preferable that the retardation layer 22 has reverse dispersibility. In a case where the retardation layer 22 has reverse dispersibility, the light incident into the reflective circular polarizer 14b is converted into more ideal circularly polarized light, and stray light can be further reduced, which is preferable.

Due to the same reason it is also preferable that the retardation layer 24 has reverse dispersibility.

Next, a specific configuration of the aerial image display system that displays the superimposed image of the non-floating image and the aerial image shown in FIG. 3 will be described.

Figure 11:
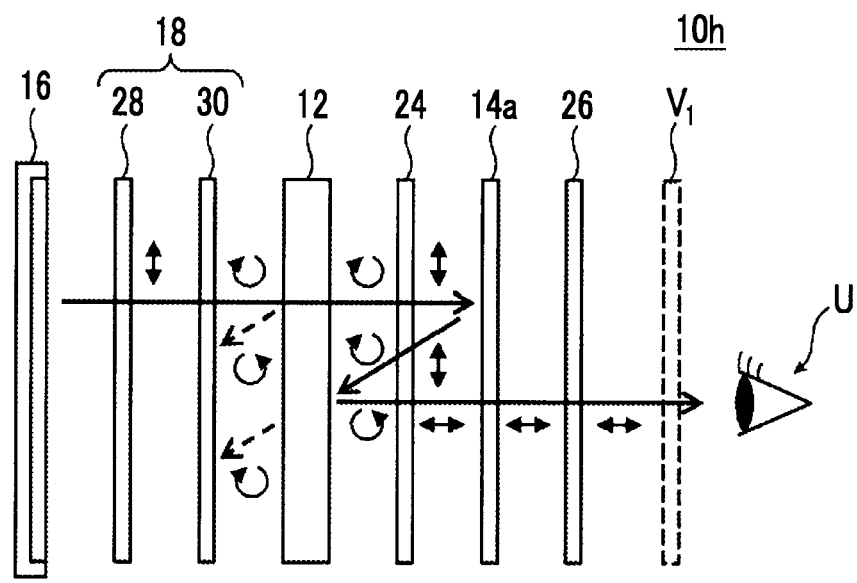
FIG. 11 is a diagram conceptually showing another example of the aerial image display system according to the present invention and showing a state where an aerial image is displayed.
Figure 12:
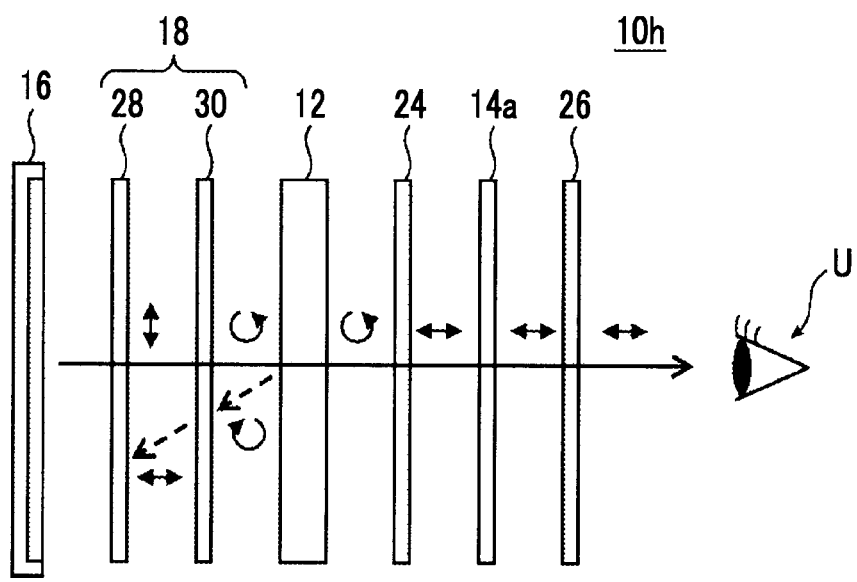
FIG. 12 is a diagram showing a state where the aerial image display system shown in FIG. 11 displays a non-floating image.

FIGS. 11 and 12 are diagrams conceptually showing another example of the aerial image display system according to the present invention.

An aerial image display system 10h shown in FIGS. 11 and 12 includes the image display apparatus 16, the polarization separating element 18, the half mirror 12, the retardation layer 24, and the reflective linear polarizer 14a. In addition, as a preferable aspect, the aerial image display system 10h includes the absorptive linear polarizer 26 that is provided on the visible side further than the reflective linear polarizer 14a.

That is, the aerial image display system 10h includes, as the reflective polarizer 14, the reflective linear polarizer 14a that allows transmission of linearly polarized light that vibrates in one direction and reflects linearly polarized light in a direction orthogonal to the direction.

In addition, in the example shown in the drawing, the polarization separating element 18 includes an absorptive linear polarizer 28 and a retardation layer 30. Although described below in detail, the polarization separating element 18 is any one of: a combination in which the absorptive linear polarizer 28 is any one of an active polarizer that is capable of switching a direction of a transmission axis (absorption axis) or a patterned polarizer that includes a plurality of regions having different directions of transmission axes (absorption axes) and the retardation layer 30 is a typical retardation layer; or a combination in which the retardation layer 30 is any one of an active retardation layer that is capable of switching a direction of a slow axis or a size of retardation or a patterned retardation layer that includes a plurality of regions having different directions of slow axes or different sizes of retardation and the absorptive linear polarizer 28 is a typical absorptive linear polarizer.

In a case where the polarization separating element 18 is the active polarizer or the active retardation layer, the polarization separating element 18 can switch between a state where, in incident light, transmission of one polarized light is allowed and polarized light orthogonal to the one polarized light is absorbed and a state where transmission of the orthogonal polarized light is allowed and the one polarized light is absorbed. Hereinafter, the polarization separating element 18 will also be referred to as "time-division polarization separating element 18".

In a case where the polarization separating element 18 is the time-division polarization separating element 18, the image display apparatus 16 alternately displays the non-floating image R and the aerial image $V_1$ by time-division according to the switching operation of the polarization separating element 18.

In the aerial image display system, at a timing at which the non-floating image R is displayed, the image display apparatus 16 displays only the non-floating image R by operating such that the polarization separating element 18 allows transmission of only polarized light passing through the optical path for the non-floating image R and does not allow transmission of polarized light passing through the optical path for the aerial image $V_1$, and at a timing at which the aerial image $V_1$ is displayed, the image display apparatus 16 displays only the aerial image $V_1$ by operating such that the polarization separating element 18 allows transmission of only polarized light passing through the optical path for the aerial image $V_1$ and does not allow transmission of polarized light passing through the optical path for the non-floating image R. The aerial image display system 10h displays the superimposed image $V_2$ where the non-floating image R and the aerial image $V_1$ are superimposed on each other by alternately displaying the non-floating image R and the aerial image $V_1$.

In addition, in a case where the polarization separating element 18 is the patterned polarizer or the patterned retardation layer, the polarization separating element 18 includes a plurality of regions where, in incident light, transmission of one polarized light is allowed and polarized light orthogonal to the one polarized light is absorbed and regions where transmission of the orthogonal polarized light is allowed and the one polarized light is absorbed. Hereinafter, the polarization separating element 18 will also be referred to as "space-division polarization separating element 18".

In a case where the polarization separating element 18 is the space-division polarization separating element 18, the image display apparatus 16 displays the non-floating image R and the aerial image $V_1$ by space-division according to the configuration of the region division of the polarization separating element 18. For example, in a case where the polarization separating element 18 includes a region where transmission of one polarized light is allowed and a region where transmission of another polarized light is allowed alternately in a stripe shape, the image display apparatus 16 alternately arranges and displays the non-floating image R and the aerial image $V_1$ by space-division in a stripe shape.

In the aerial image display system, in the region where the non-floating image R is displayed, the image display apparatus 16 displays only the non-floating image R by operating such that the polarization separating element 18 allows transmission of only polarized light passing through the optical path for the non-floating image R and does not allow transmission of polarized light passing through the optical path for the aerial image $V_1$, and in the region where the aerial image $V_1$ is displayed, the image display apparatus 16 displays only the aerial image $V_1$ by operating such that the polarization separating element 18 allows transmission of only polarized light passing through the optical path for the aerial image $V_1$ and does not allow transmission of polarized light passing through the optical path for the non-floating image R. The aerial image display system 10h displays the superimposed image $V_2$ where the non-floating image R and the aerial image $V_1$ are superimposed on each other by displaying the non-floating image R and the aerial image $V_1$ in the respective regions.

In the example shown in FIG. 11, in the aerial image display system 10h, the timing at which the aerial image $V_1$ is displayed or the state of the region where the aerial image $V_1$ is displayed is shown.

An action of the aerial image display system 10h in the state will be described.

The image display apparatus 16 emits light for an image (aerial image). In this case, as described above, light is emitted from each of points (each of pixels) on the image display apparatus 16 toward various directions. The light emitted from the image display apparatus 16 transmits through the absorptive linear polarizer 28 of the polarization separating element 18 to be converted into linearly polarized light in one direction. In the example shown in the drawing, for example, the absorptive linear polarizer 28 allows transmission of linearly polarized light in an up-down direction in the drawing. Next, this linearly polarized light transmits through the retardation layer 30 of the polarization separating element 18 to be converted into circularly polarized light. In the example shown in the drawing, for example, the retardation layer 30 converts the linearly polarized light in the up-down direction into right circularly polarized light.

In a case where the right circularly polarized light is incident into the half mirror 12, a part of the light is reflected to be converted into left circularly polarized light, and is incident into the retardation layer 30 to be converted into linearly polarized light in the left-right direction. This linearly polarized light is linearly polarized light in a direction where the light does not transmit through the absorptive linear polarizer 28, and thus is absorbed by the absorptive linear polarizer 28.

On the other hand, the remaining light of the right circularly polarized light incident into the half mirror 12 transmits through the half mirror 12 and transmits through the retardation layer 24. In this case, the light is converted into linearly polarized light by the retardation layer 24. In the example shown in the drawing, for example, the retardation layer 24 converts the right circularly polarized light into linearly polarized light in the up-down direction.

The linearly polarized light transmitted through the retardation layer 24 is incident into the reflective linear polarizer 14a. In the example shown in the drawing, the reflective linear polarizer 14a reflects the linearly polarized light in the up-down direction. Therefore, the linearly polarized light incident into the reflective linear polarizer 14a is reflected to be incident into the retardation layer 24. The linearly polarized light in the up-down direction incident into the retardation layer 24 is converted into right circularly polarized light.

This right circularly polarized light is incident into the half mirror 12, and a part of the incident light is reflected. In this case, the right circularly polarized light is converted into left circularly polarized light by reflection. In addition, the half mirror 12 is any one of a concave mirror, a Fresnel mirror, or a retroreflective member, and thus reflects light to collect the light.

On the other hand, the remaining light of the right circularly polarized light incident into the half mirror 12 transmits through the half mirror 12. The right circularly polarized light transmitted through the half mirror 12 is converted into linearly polarized light by the retardation layer 30, transmits through the absorptive linear polarizer 28, and is absorbed by the surface or the like of the image display apparatus 16.

The left circularly polarized light reflected from the half mirror 12 is incident into the retardation layer 24 to be converted into linearly polarized light in the left-right direction.

This linearly polarized light is a linearly polarized light in a direction orthogonal to that of the linearly polarized light reflected from the reflective linear polarizer 14a, and thus transmits through the reflective linear polarizer 14a. The linearly polarized light transmitted through the reflective linear polarizer 14a is incident into the absorptive linear polarizer 26. The absorptive linear polarizer 26 allows transmission of linearly polarized light in the same direction as that of the linearly polarized light transmitted through the reflective linear polarizer 14a. Accordingly, in the example shown in the drawing, the absorptive linear polarizer 26 allows transmission of the linearly polarized light in the left-right direction in the drawing.

As described above, in the aerial image display system 10h, at the timing at which the image display apparatus 16 displays the aerial image $V_1$ or in the region where the image display apparatus 16 displays the aerial image $V_1$, only the light of the optical path for the aerial image $V_1$ is emitted to the user U side, and the image displayed by the image display apparatus 16 is prevented from being recognized as the non-floating image. As a result, in the image display apparatus 16, the image to be displayed as the aerial image $V_1$ can be prevented from being displayed as the non-floating image, and only the aerial image $V_1$ can be displayed.

In addition, as a preferable aspect, the aerial image display system 10h includes the absorptive linear polarizer 26 that is provided on the visible side further than the reflective linear polarizer 14a. By including the absorptive linear polarizer 26, stray light such as the linearly polarized light component in the up-down direction that is not completely reflected from the reflective linear polarizer 14a can be absorbed by the absorptive linear polarizer 26, and recognition of an unnecessary image caused by the stray light can be more reliably suppressed. In addition, external light is reflected from the surface of the aerial image display system 10h, and so-called glittering can be prevented.

In addition, in a preferable aspect, in the aerial image display system 10h, an absorption axis of the absorptive linear polarizer 28 and an absorption axis of the absorptive linear polarizer 26 are orthogonal to each other. In addition, the transmission axis of the reflective linear polarizer 14a and the transmission axis of the absorptive linear polarizer 26 are parallel to each other. Further, at the timing at which the aerial image $V_1$ is displayed or in the state of the region where the aerial image $V_1$, a slow axis of the retardation layer 30 and a slow axis of the retardation layer 24 are orthogonal to each other.

In addition, it is preferable that the retardation of the retardation layer 30 and the retardation of the retardation layer 24 match with each other. In addition, it is preferable that wavelength dispersibility of the retardation layer 30 and wavelength dispersibility of the retardation layer 24 match with each other, and it is more preferable that both of the wavelength dispersibility of the retardation layer 30 and the wavelength dispersibility of the retardation layer 24 are reverse dispersibility.

With the above-described configuration, stray light such as the linearly polarized light component that is not reflected from the reflective linear polarizer 14a can be further reduced, which is preferable.

On the other hand, in the example shown in FIG. 12, in the aerial image display system 10h, the timing at which the non-floating image R is displayed or the state of the region where the non-floating image R is displayed is shown.

An action of the aerial image display system 10h in the state will be described.

The image display apparatus 16 emits light for an image (non-floating image). In this case, as described above, light is emitted from each of points (each of pixels) on the image display apparatus toward various directions. The light emitted from the image display apparatus 16 transmits through the absorptive linear polarizer 28 of the polarization separating element 18 to be converted into linearly polarized light in one direction. In the example shown in the drawing, for example, the absorptive linear polarizer 28 allows transmission of linearly polarized light in an up-down direction in the drawing. Next, this linearly polarized light transmits through the retardation layer 30 of the polarization separating element 18 to be converted into circularly polarized light. In the example shown in the drawing, for example, the retardation layer 30 converts the linearly polarized light in the up-down direction into left circularly polarized light. That is, in FIGS. 11 and 12, the retardation layer 30 is the active retardation layer or the patterned retardation layer, in the state shown in FIG. 12, the direction of the slow axis in the retardation layer 30 is different from the state shown in FIG. 11, and the linearly polarized light in the up-down direction transmitted through the retardation layer 30 is converted into left circularly polarized light opposite to the state of shown in FIG. 11.

In a case where the left circularly polarized light is incident into the half mirror 12, a part of the light is reflected to be converted into right circularly polarized light, and is incident into the retardation layer 30 to be converted into linearly polarized light in the left-right direction. This linearly polarized light is linearly polarized light in a direction where the light does not transmit through the absorptive linear polarizer 28, and thus is absorbed by the absorptive linear polarizer 28.

On the other hand, the remaining light of the left circularly polarized light incident into the half mirror 12 transmits through the half mirror 12 and transmits through the retardation layer 24. In this case, the light is converted into linearly polarized light by the retardation layer 24. In the example shown in the drawing, for example, the retardation layer 24 converts the right circularly polarized light into linearly polarized light in the up-down direction. Therefore, the left circularly polarized light is converted into linearly polarized light in the left-right direction.

The linearly polarized light in the left-right direction converted by the retardation layer 24 is incident into the reflective linear polarizer 14a. This linearly polarized light is a linearly polarized light in a direction orthogonal to that of the linearly polarized light reflected from the reflective linear polarizer 14a, and thus transmits through the reflective linear polarizer 14a. The linearly polarized light transmitted through the reflective linear polarizer 14a transmits through the absorptive linear polarizer 26, and is emitted from the aerial image display system 10h.

As described above, at the timing at which the aerial image display system 10h displays the non-floating image R or in the region where the aerial image display system 10h displays the non-floating image R, only the light of the optical path for the non-floating image R is emitted to the user U side, and the image displayed by the image display apparatus 16 is prevented from being recognized as the aerial image. As a result, in the image display apparatus 16, the image to be displayed as the non-floating image R can be prevented from being displayed as the aerial image, and only the non-floating image R can be displayed.

In the aerial image display system 10h, at the timing at which or in the region where the non-floating image R is displayed, the image display apparatus 16 displays only the non-floating image R by operating such that the polarization separating element 18 allows transmission of only polarized light passing through the optical path for the non-floating image R and does not allow transmission of polarized light passing through the optical path for the aerial image $V_1$, and at the timing at which or in the region where the aerial image $V_1$ is displayed, the image display apparatus 16 displays only the aerial image $V_1$ by operating such that the polarization separating element 18 allows transmission of only polarized light passing through the optical path for the aerial image V₁ and does not allow transmission of polarized light passing through the optical path for the non-floating image R. The aerial image display system 10h displays the superimposed image V₂ where the non-floating image R and the aerial image V₁ are superimposed on each other by displaying the non-floating image R and the aerial image V₁ by time-division or space-division.

Figure 13:
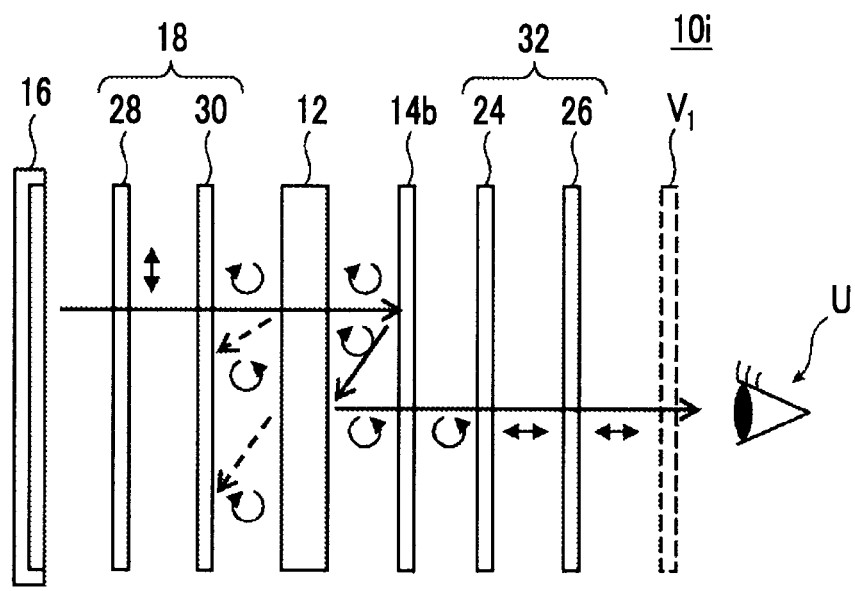
FIG. 13 is a diagram conceptually showing another example of the aerial image display system according to the present invention and showing a state where an aerial image is displayed.
Figure 14:
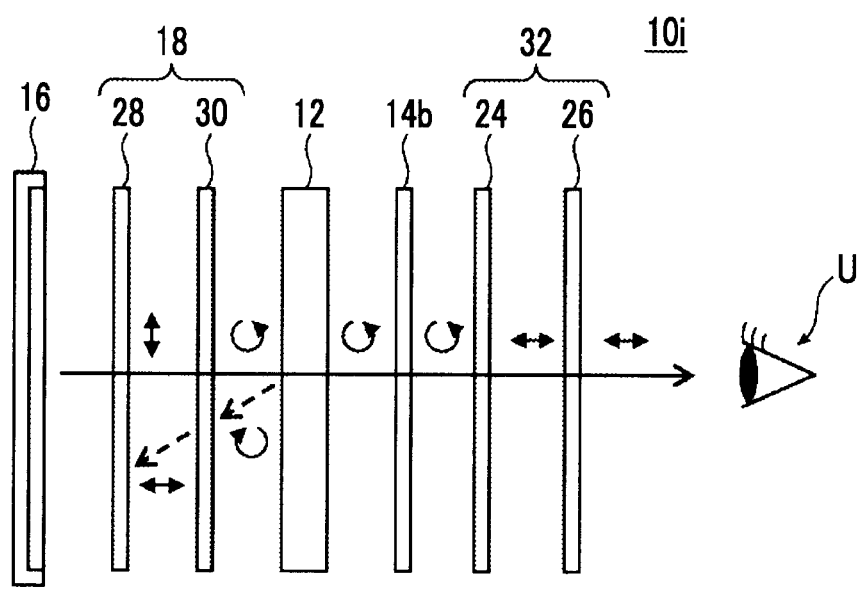
FIG. 14 is a diagram showing a state where the aerial image display system shown in FIG. 13 displays a non-floating image.

FIGS. 13 and 14 are diagrams conceptually showing another example of the aerial image display system according to the present invention.

An aerial image display system 10i shown in FIGS. 13 and 14 includes the image display apparatus 16, the polarization separating element 18, the half mirror 12, and the reflective circular polarizer 14b. In addition, as a preferable aspect, the aerial image display system 10i includes the absorptive circular polarizer 32 that is provided on the visible side further than the reflective circular polarizer 14b.

In the example shown in FIG. 13, in the aerial image display system 10i, the timing at which the aerial image V₁ is displayed or the state of the region where the aerial image V₁ is displayed is shown.

An action of the aerial image display system 10i in the state will be described.

The image display apparatus 16 emits light for an image (aerial image). In this case, as described above, light is emitted from each of points (each of pixels) on the image display apparatus toward various directions. The light emitted from the image display apparatus 16 transmits through the absorptive linear polarizer 28 of the polarization separating element 18 to be converted into linearly polarized light in one direction. In the example shown in the drawing, for example, the absorptive linear polarizer 28 allows transmission of linearly polarized light in an up-down direction in the drawing. Next, this linearly polarized light transmits through the retardation layer 30 of the polarization separating element 18 to be converted into circularly polarized light. In the example shown in the drawing, for example, the retardation layer 30 converts the linearly polarized light in the up-down direction into right circularly polarized light.

In a case where the right circularly polarized light is incident into the half mirror 12, a part of the light is reflected to be converted into left circularly polarized light, and is incident into the retardation layer 30 to be converted into linearly polarized light in the left-right direction. This linearly polarized light is linearly polarized light in a direction where the light does not transmit through the absorptive linear polarizer 28, and thus is absorbed by the absorptive linear polarizer 28.

On the other hand, the remaining light of the right circularly polarized light incident into the half mirror 12 transmits through the half mirror 12 and is incident into the reflective circular polarizer 14b. In the example shown in the drawing, the reflective circular polarizer 14b reflects right circularly polarized light. Therefore, the right circularly polarized light incident into the reflective circular polarizer 14b is reflected to be incident into the half mirror 12.

A part of the light incident into the half mirror 12 is reflected. In this case, the right circularly polarized light is converted into left circularly polarized light by reflection. In addition, the half mirror 12 is any one of a concave mirror, a Fresnel mirror, or a retroreflective member, and thus reflects light to collect the light.

On the other hand, the remaining light of the right circularly polarized light incident into the half mirror 12 transmits through the half mirror 12. The right circularly polarized light transmitted through the half mirror 12 is converted into linearly polarized light by the retardation layer 30, transmits through the absorptive linear polarizer 28, and is absorbed by the surface or the like of the image display apparatus 16.

The left circularly polarized light reflected from the half mirror 12 is incident into the reflective circular polarizer 14b. The reflective circular polarizer 14b reflects right circularly polarized light, and thus allows transmission of left circularly polarized light. The left circularly polarized light transmitted through the reflective circular polarizer 14b is incident into the absorptive circular polarizer 32. The absorptive circular polarizer 32 allows transmission of circularly polarized light having the same turning direction as circularly polarized light that transmits through the reflective circular polarizer 14b while converting the circularly polarized light into linearly polarized light. Accordingly, in the example shown in the drawing, the absorptive circular polarizer 32 allows transmission of left circularly polarized light. Specifically, the left circularly polarized light transmitted through the reflective circular polarizer 14b is incident into the retardation layer 24. The retardation layer 24 converts the incident left circularly polarized light into linearly polarized light in the left-right direction. The linearly polarized light transmitted through the retardation layer 24 is incident into the absorptive linear polarizer 26. The absorptive linear polarizer 26 allows transmission of the linearly polarized light in the left-right direction. As a result, the absorptive circular polarizer 32 allows transmission of circularly polarized light having the same turning direction as circularly polarized light that transmits through the reflective circular polarizer 14b while converting the circularly polarized light into linearly polarized light.

As described above, in the aerial image display system 10i, at the timing at which the image display apparatus 16 displays the aerial image V₁ or in the region where the image display apparatus 16 displays the aerial image V₁, only the light of the optical path for the aerial image V₁ is emitted to the user U side, and the image displayed by the image display apparatus 16 is prevented from being recognized as the non-floating image. As a result, in the image display apparatus 16, the image to be displayed as the aerial image V₁ can be prevented from being displayed as the non-floating image, and only the aerial image V₁ can be displayed.

In addition, as a preferable aspect, the aerial image display system 10i includes the absorptive circular polarizer 32 that is provided on the visible side further than the reflective circular polarizer 14b. By including the absorptive circular polarizer 32, stray light such as the right circularly polarized light component that is not completely reflected from the reflective circular polarizer 14b can be absorbed by the absorptive circular polarizer 32, and recognition of an unnecessary image caused by the stray light can be more reliably suppressed. In addition, external light is reflected from the surface of the aerial image display system 10i, and so-called glittering can be prevented.

Here, in the aerial image display system 10i, it is preferable that the retardation layer 30 has reverse dispersibility. In a case where the retardation layer 30 has reverse dispersibility, the light incident into the reflective circular polarizer 14b is converted into more ideal circularly polarized light, and stray light can be further reduced, which is preferable.

Due to the same reason it is also preferable that the retardation layer 24 has reverse dispersibility.

On the other hand, in the example shown in FIG. 14, in the aerial image display system 10i, the timing at which the non-floating image R is displayed or the state of the region where the non-floating image R is displayed is shown.

An action of the aerial image display system 10i in the state will be described.

The image display apparatus 16 emits light for an image (non-floating image). In this case, as described above, light is emitted from each of points (each of pixels) on the image display apparatus toward various directions. The light emitted from the image display apparatus 16 transmits through the absorptive linear polarizer 28 of the polarization separating element 18 to be converted into linearly polarized light in one direction. In the example shown in the drawing, for example, the absorptive linear polarizer 28 allows transmission of linearly polarized light in an up-down direction in the drawing. Next, this linearly polarized light transmits through the retardation layer 30 of the polarization separating element 18 to be converted into circularly polarized light. In the example shown in the drawing, for example, the retardation layer 30 converts the linearly polarized light in the up-down direction into left circularly polarized light. That is, in FIGS. 13 and 14, the retardation layer 30 is the active retardation layer or the patterned retardation layer, in the state shown in FIG. 14, the direction of the slow axis in the retardation layer 30 is different from the state shown in FIG. 13, and the linearly polarized light in the up-down direction transmitted through the retardation layer 30 is converted into left circularly polarized light opposite to the state of shown in FIG. 13.

In a case where the left circularly polarized light is incident into the half mirror 12, a part of the light is reflected to be converted into right circularly polarized light, and is incident into the retardation layer 30 to be converted into linearly polarized light in the left-right direction. This linearly polarized light is linearly polarized light in a direction where the light does not transmit through the absorptive linear polarizer 28, and thus is absorbed by the absorptive linear polarizer 28.

On the other hand, the remaining light of the left circularly polarized light incident into the half mirror 12 transmits through the half mirror 12 and is incident into the reflective circular polarizer 14b. The incident light is circularly polarized light having a turning direction opposite to that of the circularly polarized light reflected from the reflective circular polarizer 14b, and thus transmits through the reflective circular polarizer 14b.

The left circularly polarized light transmitted through the reflective circular polarizer 14b is incident into the absorptive circular polarizer 32. As described above, the absorptive circular polarizer 32 converts the incident left circularly polarized light into linearly polarized light in the left-right direction and allows transmission of the light.

As described above, at the timing at which the aerial image display system 10i displays the non-floating image R or in the region where the aerial image display system 10i displays the non-floating image R, only the light of the optical path for the non-floating image R is emitted to the user U side, and the image displayed by the image display apparatus 16 is prevented from being recognized as the aerial image. As a result, in the image display apparatus 16, the image to be displayed as the non-floating image R can be prevented from being displayed as the aerial image, and only the non-floating image R can be displayed.

In the aerial image display system 10i, at the timing at which or in the region where the non-floating image R is displayed, the image display apparatus 16 displays only the non-floating image R by operating such that the polarization separating element 18 allows transmission of only polarized light passing through the optical path for the non-floating image R and does not allow transmission of polarized light passing through the optical path for the aerial image $V_1$, and at the timing at which or in the region where the aerial image $V_1$ is displayed, the image display apparatus 16 displays only the aerial image $V_1$ by operating such that the polarization separating element 18 allows transmission of only polarized light passing through the optical path for the aerial image $V_1$ and does not allow transmission of polarized light passing through the optical path for the non-floating image R. The aerial image display system 10i displays the superimposed image $V_2$ where the non-floating image R and the aerial image $V_1$ are superimposed on each other by displaying the non-floating image R and the aerial image $V_1$ by time-division or space-division.

In the example shown in FIGS. 11 to 14, the polarization separating element 18 is disposed between the image display apparatus 16 and the half mirror 12.

Figure 15:
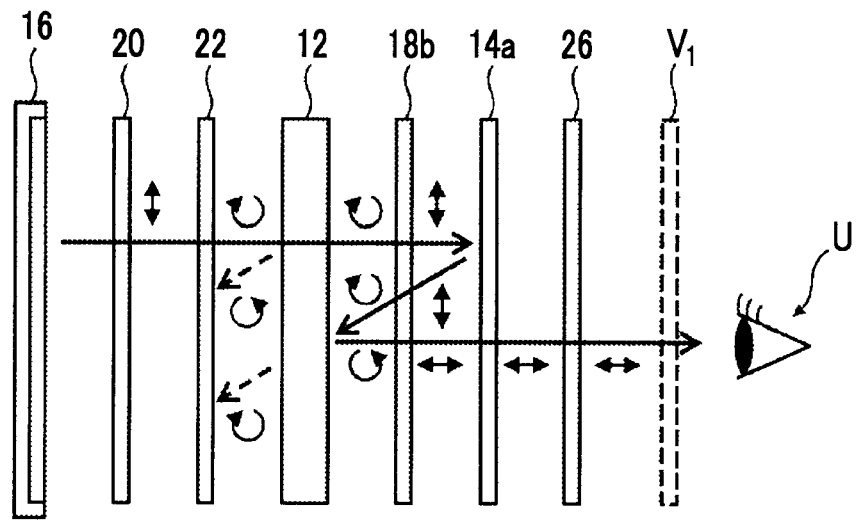
FIG. 15 is a diagram conceptually showing another example of the aerial image display system according to the present invention and showing a state where an aerial image is displayed.
Figure 16:
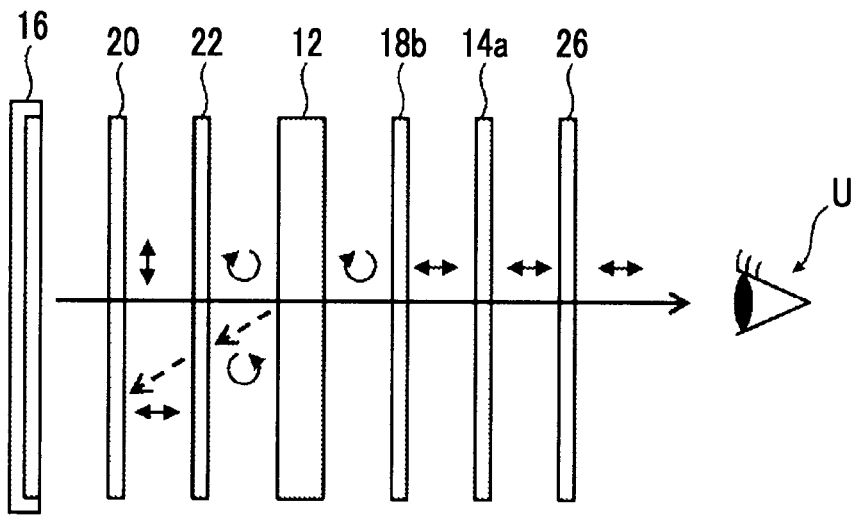
FIG. 16 is a diagram showing a state where the aerial image display system shown in FIG. 15 displays a non-floating image.

FIGS. 15 and 16 are diagrams conceptually showing another example of the aerial image display system according to the present invention. An aerial image display system 10j shown in FIGS. 15 and 16 includes a polarization separating element 18b that is formed of the active retardation layer or the patterned retardation layer.

The aerial image display system 10j shown in FIGS. 15 and 16 includes the image display apparatus 16, the absorptive linear polarizer 20, the retardation layer 22, the half mirror 12, the polarization separating element 18b, and the reflective linear polarizer 14a. In addition, as a preferable aspect, the aerial image display system 10j includes the absorptive linear polarizer 26 that is provided on the visible side further than the reflective linear polarizer 14a.

In the example shown in FIG. 15, in the aerial image display system 10j, the timing at which the aerial image $V_1$ is displayed or the state of the region where the aerial image $V_1$ is displayed is shown.

An action of the aerial image display system 10j in the state will be described.

The image display apparatus 16 emits light for an image (aerial image). In this case, as described above, light is emitted from each of points (each of pixels) on the image display apparatus toward various directions. The light emitted from the image display apparatus 16 transmits through the absorptive linear polarizer 20 to be converted into linearly polarized light in one direction. In the example shown in the drawing, for example, the absorptive linear polarizer 20 allows transmission of linearly polarized light in an up-down direction in the drawing. Next, this linearly polarized light transmits through the retardation layer 22 to be converted into circularly polarized light. In the example shown in the drawing, for example, the retardation layer 22 converts the linearly polarized light in the up-down direction into right circularly polarized light.

In a case where the right circularly polarized light is incident into the half mirror 12, a part of the light is reflected to be converted into left circularly polarized light, and is incident into the retardation layer 22 to be converted into linearly polarized light in the left-right direction. This linearly polarized light is linearly polarized light in a direction where the light does not transmit through the absorptive linear polarizer 20, and thus is absorbed by the absorptive linear polarizer 20.

On the other hand, the remaining light of the right circularly polarized light incident into the half mirror 12 transmits through the half mirror 12 and transmits through the polarization separating element 18b. The polarization separating element 18b is the active retardation layer or the patterned retardation layer. Accordingly, the light is converted into linearly polarized light by the polarization separating element 18b as the retardation layer. In the example shown in the drawing, for example, the polarization separating element 18b converts the right circularly polarized light into linearly polarized light in the up-down direction.

The linearly polarized light transmitted through the polarization separating element 18b is incident into the reflective linear polarizer 14a. In the example shown in the drawing, the reflective linear polarizer 14a reflects the linearly polarized light in the up-down direction. Therefore, the linearly polarized light incident into the reflective linear polarizer 14a is reflected to be incident into the polarization separating element 18b. The linearly polarized light in the up-down direction incident into the polarization separating element 18b is converted into right circularly polarized light.

This right circularly polarized light is incident into the half mirror 12, and a part of the incident light is reflected. In this case, the right circularly polarized light is converted into left circularly polarized light by reflection. In addition, the half mirror 12 is any one of a concave mirror, a Fresnel mirror, or a retroreflective member, and thus reflects light to collect the light.

On the other hand, the remaining light of the right circularly polarized light incident into the half mirror 12 transmits through the half mirror 12. The right circularly polarized light transmitted through the half mirror 12 is converted into linearly polarized light by the retardation layer 22, transmits through the absorptive linear polarizer 20, and is absorbed by the surface or the like of the image display apparatus 16.

The left circularly polarized light reflected from the half mirror 12 is incident into the polarization separating element 18b to be converted into linearly polarized light in the left-right direction.

This linearly polarized light is a linearly polarized light in a direction orthogonal to that of the linearly polarized light reflected from the reflective linear polarizer 14a, and thus transmits through the reflective linear polarizer 14a. The linearly polarized light transmitted through the reflective linear polarizer 14a is incident into the absorptive linear polarizer 26. The absorptive linear polarizer 26 allows transmission of linearly polarized light in the same direction as that of the linearly polarized light transmitted through the reflective linear polarizer 14a. Accordingly, in the example shown in the drawing, the absorptive linear polarizer 26 allows transmission of the linearly polarized light in the left-right direction in the drawing.

As described above, in the aerial image display system 10j, at the timing at which the image display apparatus 16 displays the aerial image $V_1$ or in the region where the image display apparatus 16 displays the aerial image $V_1$, only the light of the optical path for the aerial image $V_1$ is emitted to the user U side, and the image displayed by the image display apparatus 16 is prevented from being recognized as the non-floating image. As a result, in the image display apparatus 16, the image to be displayed as the aerial image $V_1$ can be prevented from being displayed as the non-floating image, and only the aerial image $V_1$ can be displayed.

In addition, as a preferable aspect, the aerial image display system 10j includes the absorptive linear polarizer 26 that is provided on the visible side further than the reflective linear polarizer 14a. By including the absorptive linear polarizer 26, stray light such as the linearly polarized light component in the up-down direction that is not completely reflected from the reflective linear polarizer 14a can be absorbed by the absorptive linear polarizer 26, and recognition of an unnecessary image caused by the stray light can be more reliably suppressed. In addition, external light is reflected from the surface of the aerial image display system 10j, and so-called glittering can be prevented.

In addition, in a preferable aspect, in the aerial image display system 10j, the absorption axis of the absorptive linear polarizer 20 and the absorption axis of the absorptive linear polarizer 26 are orthogonal to each other. In addition, the transmission axis of the reflective linear polarizer 14a and the transmission axis of the absorptive linear polarizer 26 are parallel to each other. Further, at the timing at which the aerial image $V_1$ is displayed or in the state of the region where the aerial image $V_1$, the slow axis of the retardation layer 22 and a slow axis of the polarization separating element 18b are orthogonal to each other.

In addition, it is preferable that the retardation of the retardation layer 22 and the retardation of the polarization separating element 18b match with each other. In addition, it is preferable that wavelength dispersibility of the retardation layer 22 and wavelength dispersibility of the polarization separating element 18b match with each other, and it is more preferable that both of the wavelength dispersibility of the retardation layer 22 and the wavelength dispersibility of the polarization separating element 18b are reverse dispersibility.

With the above-described configuration, stray light such as the linearly polarized light component that is not completely reflected from the reflective linear polarizer 14a can be further reduced, which is preferable.

On the other hand, in the example shown in FIG. 16, in the aerial image display system 10j, the timing at which the non-floating image R is displayed or the state of the region where the non-floating image R is displayed is shown.

An action of the aerial image display system 10j in the state will be described.

The image display apparatus 16 emits light for an image (non-floating image). In this case, as described above, light is emitted from each of points (each of pixels) on the image display apparatus toward various directions. The light emitted from the image display apparatus 16 transmits through the absorptive linear polarizer 20 to be converted into linearly polarized light in one direction. In the example shown in the drawing, for example, the absorptive linear polarizer 20 allows transmission of linearly polarized light in an up-down direction in the drawing. Next, this linearly polarized light transmits through the retardation layer 22 to be converted into right circularly polarized light.

In a case where the right circularly polarized light is incident into the half mirror 12, a part of the light is reflected to be converted into left circularly polarized light, and is incident into the retardation layer 22 to be converted into linearly polarized light in the left-right direction. This linearly polarized light is linearly polarized light in a direction where the light does not transmit through the absorptive linear polarizer 20, and thus is absorbed by the absorptive linear polarizer 20.

On the other hand, the remaining light of the right circularly polarized light incident into the half mirror 12 transmits through the half mirror 12 and transmits through the polarization separating element 18b. As described above, the polarization separating element 18b is the active retardation layer or the patterned retardation layer, in the state shown in FIG. 16, the direction of the slow axis in the polarization separating element 18b is different from the state shown in FIG. 15, and the right circularly polarized light transmitted through the polarization separating element 18b is converted into linearly polarized light in the left-right direction orthogonal to the state shown in FIG. 15.

The linearly polarized light in the left-right direction converted by the polarization separating element 18b is incident into the reflective linear polarizer 14a. This linearly polarized light is a linearly polarized light in a direction orthogonal to that of the linearly polarized light reflected from the reflective linear polarizer 14a, and thus transmits through the reflective linear polarizer 14a. The linearly polarized light transmitted through the reflective linear polarizer 14a transmits through the absorptive linear polarizer 26, and is emitted from the aerial image display system 10j.

As described above, at the timing at which the aerial image display system 10j displays the non-floating image R or in the region where the aerial image display system 10j displays the non-floating image R, only the light of the optical path for the non-floating image R is emitted to the user U side, and the image displayed by the image display apparatus 16 is prevented from being recognized as the aerial image. As a result, in the image display apparatus 16, the image to be displayed as the non-floating image R can be prevented from being displayed as the aerial image, and only the non-floating image R can be displayed.

In the aerial image display system 10j, at the timing at which or in the region where the non-floating image R is displayed, the image display apparatus 16 displays only the non-floating image R by operating such that the polarization separating element 18b allows transmission of only polarized light passing through the optical path for the non-floating image R and does not allow transmission of polarized light passing through the optical path for the aerial image $V_1$, and at the timing at which or in the region where the aerial image $V_1$ is displayed, the image display apparatus 16 displays only the aerial image $V_1$ by operating such that the polarization separating element 18b allows transmission of only polarized light passing through the optical path for the aerial image $V_1$ and does not allow transmission of polarized light passing through the optical path for the non-floating image R. The aerial image display system 10j displays the superimposed image $V_2$ where the non-floating image R and the aerial image $V_1$ are superimposed on each other by displaying the non-floating image R and the aerial image $V_1$ by time-division or space-division.

In the example shown in FIGS. 11 to 16, the half mirror is disposed on the image display apparatus side, and the reflective polarizer is disposed on the visible side.

Figure 17:
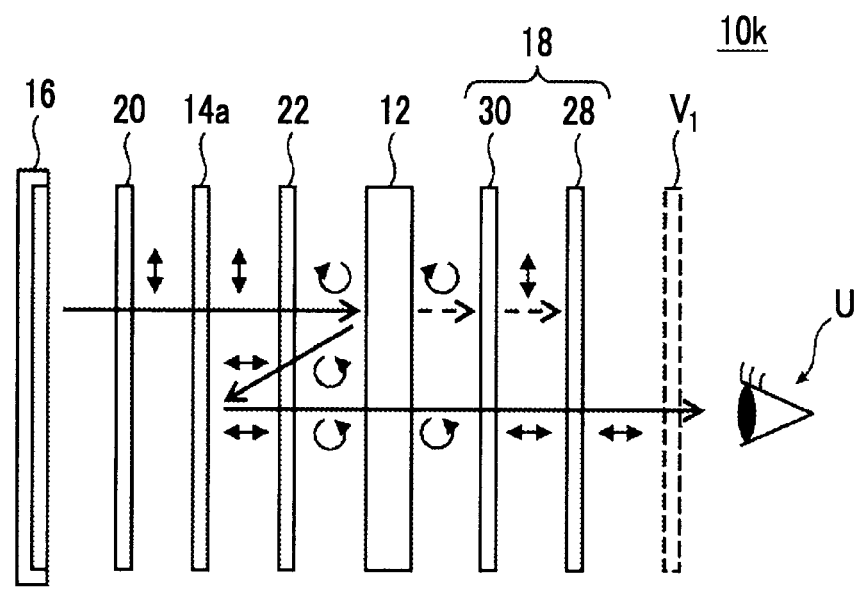
FIG. 17 is a diagram conceptually showing another example of the aerial image display system according to the present invention and showing a state where an aerial image is displayed.
Figure 18:
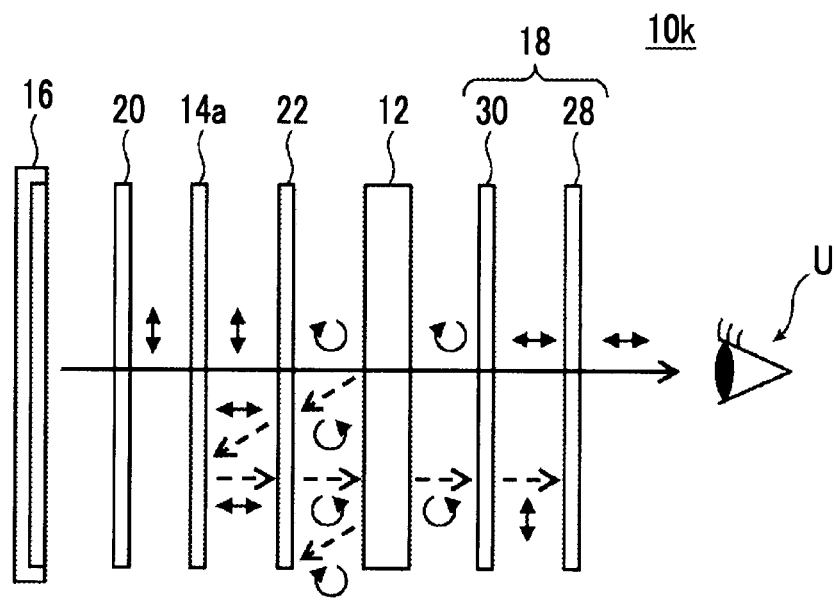
FIG. 18 is a diagram showing a state where the aerial image display system shown in FIG. 17 displays a non-floating image.

FIGS. 17 and 18 are diagrams conceptually showing another example of the aerial image display system according to the present invention.

An aerial image display system 10k shown in FIGS. 17 and 18 includes the image display apparatus 16, the absorptive linear polarizer 20, the reflective linear polarizer 14a, the retardation layer 22, the half mirror 12, and the polarization separating element 18.

In the example shown in FIG. 17, in the aerial image display system 10k, the timing at which the aerial image $V_1$ is displayed or the state of the region where the aerial image $V_1$ is displayed is shown.

An action of the aerial image display system 10k in the state will be described.

The image display apparatus 16 emits light for an image (aerial image). In this case, as described above, light is emitted from each of points (each of pixels) on the image display apparatus toward various directions. The light emitted from the image display apparatus 16 transmits through the absorptive linear polarizer 20 to be converted into linearly polarized light in one direction. In the example shown in the drawing, for example, the absorptive linear polarizer 20 allows transmission of linearly polarized light in an up-down direction in the drawing. Next, the linearly polarized light is incident into the reflective linear polarizer 14a. In the example shown in the drawing, the reflective linear polarizer 14a allows transmission of the linearly polarized light in the up-down direction. Therefore, the linearly polarized light incident into the reflective linear polarizer 14a transmits through the reflective linear polarizer 14a to be incident into the retardation layer 22 without being reflected. The retardation layer 22 converts the incident linearly polarized light into circularly polarized light. In the example shown in the drawing, for example, the retardation layer 22 converts the linearly polarized light in the up-down direction into right circularly polarized light.

This right circularly polarized light is incident into the half mirror 12, and a part of the incident light transmits through the half mirror 12. The right circularly polarized light transmitted through the half mirror 12 is incident into the polarization separating element 18. In the example shown in the drawing, the polarization separating element 18 allows transmission of left circularly polarized light and absorbs right circularly polarized light. Therefore, the right circularly polarized light incident into the polarization separating element 18 is absorbed. Specifically, the polarization separating element 18 includes the retardation layer 30 and the absorptive linear polarizer 28, and the right circularly polarized light transmitted through the half mirror 12 is converted into linearly polarized light in the up-down direction by the retardation layer 30. The absorptive linear polarizer 28 absorbs the linearly polarized light in the up-down direction. Therefore, the linearly polarized light in the up-down direction is absorbed by the absorptive linear polarizer 28.

On the other hand, the remaining light of the right circularly polarized light incident into the half mirror 12 is reflected from the half mirror 12. In this case, the right circularly polarized light is converted into left circularly polarized light by reflection. In addition, the half mirror 12 is any one of a concave mirror, a Fresnel mirror, or a retroreflective member, and thus reflects light to collect the light.

The left circularly polarized light reflected from the half mirror 12 is incident into the retardation layer 22 to be converted into linearly polarized light in the left-right direction. The linearly polarized light is incident into the reflective linear polarizer 14a. In the example shown in the drawing, the reflective linear polarizer 14a reflects the linearly polarized light in the left-right direction. Therefore, the linearly polarized light incident into the reflective linear polarizer 14a is reflected. The linearly polarized light reflected from the reflective linear polarizer 14a is incident into the retardation layer 22, is converted into left circularly polarized light, and is incident into the half mirror 12.

A part of the left circularly polarized light incident into the half mirror 12 is reflected to be converted into right circularly polarized light, and is incident into the retardation layer 22 to be converted into linearly polarized light in the up-down direction. The linearly polarized light transmits through the reflective linear polarizer 14a, transmits through the absorptive linear polarizer 20, and is absorbed by the surface or the like of the image display apparatus 16.

On the other hand, the remaining light of the left circularly polarized light incident into the half mirror 12 transmits through the half mirror 12. The left circularly polarized light transmitted through the half mirror 12 is incident into the polarization separating element 18. The polarization separating element 18 absorbs right circularly polarized light, and thus allows transmission of left circularly polarized light. In the example shown in the drawing, the polarization separating element 18 includes the retardation layer 30 and the absorptive linear polarizer 28, and the left circularly polarized light transmitted through the half mirror 12 is converted into linearly polarized light in the left-right direction by the retardation layer 30. The absorptive linear polarizer 28 absorbs the linearly polarized light in the up-down direction. Therefore, the linearly polarized light in the left-right direction transmits through the absorptive linear polarizer 28.

As described above, in the aerial image display system 10k, only the light of the optical path for the aerial image $V_1$ is emitted to the user U side, and the image displayed by the image display apparatus 16 is prevented from being recognized as the non-floating image. As a result, the image displayed by the image display apparatus 16 can be displayed as the aerial image $V_1$.

In a preferable aspect, in the aerial image display system 10k, the absorption axis of the absorptive linear polarizer 20 and the absorption axis of the absorptive linear polarizer 28 are orthogonal to each other. In addition, the transmission axis of the reflective linear polarizer 14a and the transmission axis of the absorptive linear polarizer 20 are parallel to each other. Further, at the timing at which the aerial image $V_1$ is displayed or in the state of the region where the aerial image $V_1$, the slow axis of the retardation layer 22 and the slow axis of the retardation layer 30 are orthogonal to each other.

In addition, it is preferable that the retardation of the retardation layer 22 and the retardation of the retardation layer 30 match with each other. In addition, it is preferable that wavelength dispersibility of the retardation layer 22 and wavelength dispersibility of the retardation layer 30 match with each other, and it is more preferable that both of the wavelength dispersibility of the retardation layer 22 and the wavelength dispersibility of the retardation layer 30 are reverse dispersibility.

With the above-described configuration, stray light such as the right circularly polarized light component transmitted through the half mirror 12 can be further reduced, which is preferable.

On the other hand, in the example shown in FIG. 18, in the aerial image display system 10k, the timing at which the non-floating image R is displayed or the state of the region where the non-floating image R is displayed is shown.

An action of the aerial image display system 10k in the state will be described.

The image display apparatus 16 emits light for an image (non-floating image). In this case, as described above, light is emitted from each of points (each of pixels) on the image display apparatus toward various directions. The light emitted from the image display apparatus 16 transmits through the absorptive linear polarizer 20 to be converted into linearly polarized light in the up-down direction in the drawing. Next, the linearly polarized light is incident into the reflective linear polarizer 14a. In the example shown in the drawing, the reflective linear polarizer 14a allows transmission of the linearly polarized light in the up-down direction. Therefore, the linearly polarized light incident into the reflective linear polarizer 14a transmits through the reflective linear polarizer 14a to be incident into the retardation layer 22 without being reflected. The linearly polarized light in the up-down direction incident into the retardation layer 22 is converted into right circularly polarized light.

This right circularly polarized light is incident into the half mirror 12, and a part of the incident light transmits through the half mirror 12. The right circularly polarized light transmitted through the half mirror 12 is incident into the polarization separating element 18. The polarization separating element 18 allows transmission of right circularly polarized light. Therefore, the right circularly polarized light transmits through the polarization separating element 18 and is emitted from the aerial image display system 10k. In the example shown in the drawing, the right circularly polarized light transmits through the retardation layer 30 of the polarization separating element 18 to be converted into linearly polarized light in the left-right direction. That is, in FIGS. 17 and 18, the retardation layer 30 is the active retardation layer or the patterned retardation layer, in the state shown in FIG. 18, the direction of the slow axis in the retardation layer 30 is different from the state shown in FIG. 17, and the right circularly polarized light transmitted through the retardation layer 30 is converted into linearly polarized light in the left-right direction orthogonal to the state shown in FIG. 17. The linearly polarized light in the left-right direction converted by the retardation layer 30 is incident into the absorptive linear polarizer 28. The absorptive linear polarizer 28 absorbs the linearly polarized light in the up-down direction. Therefore, the linearly polarized light in the left-right direction transmits through the absorptive linear polarizer 28.

On the other hand, a part of the right circularly polarized light reflected from the half mirror 12 is converted into left circularly polarized light by reflection. The left circularly polarized light reflected from the half mirror 12 is converted into linearly polarized light in the left-right direction by the retardation layer 22, and is incident into the reflective linear polarizer 14a. The reflective linear polarizer 14a reflects the linearly polarized light in the left-right direction. Therefore, this linearly polarized light is reflected. The reflected linearly polarized light in the left-right direction is converted into left circularly polarized light by the retardation layer 22 and is incident into the half mirror 12.

A part of the light incident into the half mirror 12 transmits through the half mirror 12. The transmitted left circularly polarized light is incident into the polarization separating element 18. The polarization separating element 18 allows transmission of right circularly polarized light, and thus absorbs left circularly polarized light. Specifically, the left circularly polarized light transmits through the retardation layer 30 of the polarization separating element 18 and is converted into linearly polarized light in the up-down direction. The absorptive linear polarizer 28 absorbs the linearly polarized light in the up-down direction. Therefore, the linearly polarized light in the up-down direction is absorbed by the absorptive linear polarizer 28.

On the other hand, the left circularly polarized light reflected from the half mirror 12 is converted into linearly polarized light by the retardation layer 22, transmits through the reflective linear polarizer 14a and the absorptive linear polarizer 20, and is absorbed by the surface or the like of the image display apparatus 16.

As described above, at the timing at which the aerial image display system 10k displays the non-floating image R or in the region where the aerial image display system 10k displays the non-floating image R, only the light of the optical path for the non-floating image R is emitted to the user U side, and the image displayed by the image display apparatus 16 is prevented from being recognized as the aerial image. As a result, in the image display apparatus 16, the image to be displayed as the non-floating image R can be prevented from being displayed as the aerial image, and only the non-floating image R can be displayed.

In the aerial image display system 10k, at the timing at which or in the region where the non-floating image R is displayed, the image display apparatus 16 displays only the non-floating image R by operating such that the polarization separating element 18 allows transmission of only polarized light passing through the optical path for the non-floating image R and does not allow transmission of polarized light passing through the optical path for the aerial image $V_1$, and at the timing at which or in the region where the aerial image $V_1$ is displayed, the image display apparatus 16 displays only the aerial image $V_1$ by operating such that the polarization separating element 18 allows transmission of only polarized light passing through the optical path for the aerial image $V_1$ and does not allow transmission of polarized light passing through the optical path for the non-floating image R. The aerial image display system 10k displays the superimposed image $V_2$ where the non-floating image R and the aerial image $V_1$ are superimposed on each other by displaying the non-floating image R and the aerial image $V_1$ by time-division or space-division.

Figure 19:
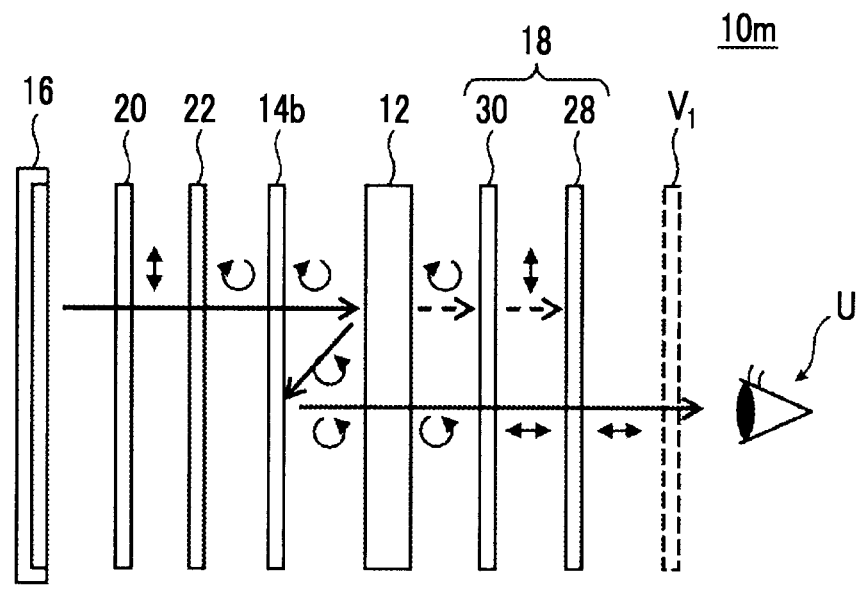
FIG. 19 is a diagram conceptually showing another example of the aerial image display system according to the present invention and showing a state where an aerial image is displayed.
Figure 20:
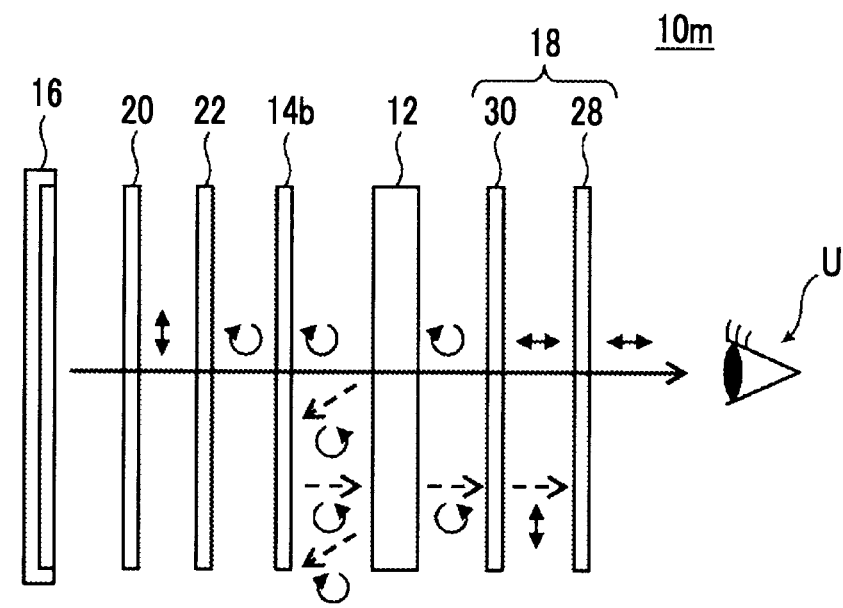
FIG. 20 is a diagram showing a state where the aerial image display system shown in FIG. 19 displays a non-floating image.

FIGS. 19 and 20 are diagrams conceptually showing another example of the aerial image display system according to the present invention.

An aerial image display system 10m shown in FIGS. 19 and 20 includes the image display apparatus 16, the absorptive linear polarizer 20, the retardation layer 22, the reflective circular polarizer 14b, the half mirror 12, and the polarization separating element 18.

In the example shown in FIG. 19, in the aerial image display system 10m, the timing at which the aerial image $V_1$ is displayed or the state of the region where the aerial image $V_1$ is displayed is shown.

An action of the aerial image display system 10m in the state will be described.

The image display apparatus 16 emits light for an image (aerial image). In this case, as described above, light is emitted from each of points (each of pixels) on the image display apparatus toward various directions. The light emitted from the image display apparatus 16 transmits through the absorptive linear polarizer 20 to be converted into linearly polarized light in one direction. In the example shown in the drawing, for example, the absorptive linear polarizer 20 allows transmission of linearly polarized light in an up-down direction in the drawing. Next, this linearly polarized light is incident into the retardation layer 22. The retardation layer 22 converts the incident linearly polarized light into circularly polarized light. In the example shown in the drawing, for example, the retardation layer 22 converts the linearly polarized light in the up-down direction into right circularly polarized light.

The right circularly polarized light is incident into the reflective circular polarizer 14b. In the example shown in the drawing, the reflective circular polarizer 14b allows transmission of right circularly polarized light and reflects left circularly polarized light. Therefore, the right circularly polarized light incident into the reflective circular polarizer 14b transmits through the reflective circular polarizer 14b to be incident into the half mirror 12 without being reflected.

This right circularly polarized light is incident into the half mirror 12, and a part of the incident light transmits through the half mirror 12. The right circularly polarized light transmitted through the half mirror 12 is incident into the polarization separating element 18. In the example shown in the drawing, the polarization separating element 18 absorbs right circularly polarized light. Therefore, the right circularly polarized light incident into the polarization separating element 18 is absorbed. Specifically, the polarization separating element 18 includes the retardation layer 30 and the absorptive linear polarizer 28, and the right circularly polarized light transmitted through the half mirror 12 is converted into linearly polarized light in the up-down direction by the retardation layer 30. The absorptive linear polarizer 28 absorbs the linearly polarized light in the up-down direction. Therefore, the linearly polarized light in the up-down direction is absorbed by the absorptive linear polarizer 28.

On the other hand, the remaining light of the right circularly polarized light incident into the half mirror 12 is reflected from the half mirror 12. In this case, the right circularly polarized light is converted into left circularly polarized light by reflection. In addition, the half mirror 12 is any one of a concave mirror, a Fresnel mirror, or a retroreflective member, and thus reflects light to collect the light.

The left circularly polarized light reflected from the half mirror 12 is incident into the reflective circular polarizer 14b. In the example shown in the drawing, the reflective circular polarizer 14b reflects left circularly polarized light. Therefore, the left circularly polarized light incident into the reflective circular polarizer 14b is reflected. The left circularly polarized light reflected from the reflective circular polarizer 14b is incident into the half mirror 12.

A part of the left circularly polarized light incident into the half mirror 12 is reflected to be converted into right circularly polarized light, and is incident into the reflective circular polarizer 14b. This right circularly polarized light transmits through the reflective circular polarizer 14b, is converted into linearly polarized light by the retardation layer 22, transmits through the absorptive linear polarizer 20, and is absorbed by the surface or the like of the image display apparatus 16.

On the other hand, the remaining light of the left circularly polarized light incident into the half mirror 12 transmits through the half mirror 12. The left circularly polarized light transmitted through the half mirror 12 is incident into the polarization separating element 18. The polarization separating element 18 absorbs right circularly polarized light, and thus allows transmission of left circularly polarized light. In the example shown in the drawing, the polarization separating element 18 includes the retardation layer 30 and the absorptive linear polarizer 28, and the left circularly polarized light transmitted through the half mirror 12 is converted into linearly polarized light in the left-right direction by the retardation layer 30. The absorptive linear polarizer 28 absorbs the linearly polarized light in the up-down direction. Therefore, the linearly polarized light in the left-right direction transmits through the absorptive linear polarizer 28.

As described above, in the aerial image display system 10m, only the light of the optical path for the aerial image $V_1$ is emitted to the user U side, and the image displayed by the image display apparatus 16 is prevented from being recognized as the non-floating image. As a result, the image displayed by the image display apparatus 16 can be displayed as the aerial image $V_1$.

In the aerial image display system 10m, it is preferable that the retardation layer 22 has reverse dispersibility. In a case where the retardation layer 22 has reverse dispersibility, the light incident into the reflective circular polarizer 14b is converted into more ideal circularly polarized light, and stray light can be further reduced, which is preferable.

In addition, due to the same reason it is also preferable that the retardation layer 30 has reverse dispersibility.

On the other hand, in the example shown in FIG. 20, in the aerial image display system 10m, the timing at which the non-floating image R is displayed or the state of the region where the non-floating image R is displayed is shown.

An action of the aerial image display system 10m in the state will be described.

The image display apparatus 16 emits light for an image (non-floating image). In this case, as described above, light is emitted from each of points (each of pixels) on the image display apparatus toward various directions. The light emitted from the image display apparatus 16 transmits through the absorptive linear polarizer 20 to be converted into linearly polarized light in one direction. In the example shown in the drawing, for example, the absorptive linear polarizer 20 allows transmission of linearly polarized light in an up-down direction in the drawing. Next, this linearly polarized light is incident into the retardation layer 22. The retardation layer 22 converts the incident linearly polarized light into circularly polarized light. In the example shown in the drawing, for example, the retardation layer 22 converts the linearly polarized light in the up-down direction into right circularly polarized light.

The right circularly polarized light is incident into the reflective circular polarizer 14b. In the example shown in the drawing, the reflective circular polarizer 14b allows transmission of right circularly polarized light and reflects left circularly polarized light. Therefore, the right circularly polarized light incident into the reflective circular polarizer 14b transmits through the reflective circular polarizer 14b to be incident into the half mirror 12 without being reflected.

This right circularly polarized light is incident into the half mirror 12, and a part of the incident light transmits through the half mirror 12. The right circularly polarized light transmitted through the half mirror 12 is incident into the polarization separating element 18. In the example shown in the drawing, the polarization separating element 18 allows transmission of right circularly polarized light. Therefore, the right circularly polarized light transmits through the polarization separating element 18 and is emitted from the aerial image display system 10m. In the example shown in the drawing, the right circularly polarized light transmits through the retardation layer 30 of the polarization separating element 18 to be converted into linearly polarized light in the left-right direction. That is, in FIGS. 19 and 20, the retardation layer 30 is the active retardation layer or the patterned retardation layer, in the state shown in FIG. 20, the direction of the slow axis in the retardation layer 30 is different from the state shown in FIG. 19, and the right circularly polarized light transmitted through the retardation layer 30 is converted into linearly polarized light in the left-right direction orthogonal to the state shown in FIG. 19. The linearly polarized light in the left-right direction converted by the retardation layer 30 is incident into the absorptive linear polarizer 28. The absorptive linear polarizer 28 absorbs the linearly polarized light in the up-down direction. Therefore, the linearly polarized light in the left-right direction transmits through the absorptive linear polarizer 28.

On the other hand, a part of the right circularly polarized light reflected from the half mirror 12 is converted into left circularly polarized light by reflection. The left circularly polarized light reflected from the half mirror 12 is incident into the reflective circular polarizer 14b. The reflective circular polarizer 14b allows transmission of right circularly polarized light and reflects left circularly polarized light. Therefore, this left circularly polarized light is reflected. The reflected left circularly polarized light is incident into the half mirror 12.

A part of the light incident into the half mirror 12 transmits through the half mirror 12. The transmitted left circularly polarized light is incident into the polarization separating element 18. The polarization separating element 18 allows transmission of right circularly polarized light, and thus absorbs left circularly polarized light. Specifically, the left circularly polarized light transmits through the retardation layer 30 of the polarization separating element 18 and is converted into linearly polarized light in the up-down direction. The absorptive linear polarizer 28 absorbs the linearly polarized light in the up-down direction. Therefore, the linearly polarized light in the up-down direction is absorbed by the absorptive linear polarizer 28.

On the other hand, the left circularly polarized light reflected from the half mirror 12 is converted into right circularly polarized light by reflection, transmits through the reflective circular polarizer 14b, is converted into linearly polarized light by the retardation layer 22, transmits through the absorptive linear polarizer 20, and is absorbed by the surface or the like of the image display apparatus 16.

As described above, at the timing at which the aerial image display system 10m displays the non-floating image R or in the region where the aerial image display system 10m displays the non-floating image R, only the light of the optical path for the non-floating image R is emitted to the user U side, and the image displayed by the image display apparatus 16 is prevented from being recognized as the aerial image. As a result, in the image display apparatus 16, the image to be displayed as the non-floating image R can be prevented from being displayed as the aerial image, and only the non-floating image R can be displayed.

In the aerial image display system 10m, at the timing at which or in the region where the non-floating image R is displayed, the image display apparatus 16 displays only the non-floating image R by operating such that the polarization separating element 18 allows transmission of only polarized light passing through the optical path for the non-floating image R and does not allow transmission of polarized light passing through the optical path for the aerial image $V_1$, and at the timing at which or in the region where the aerial image $V_1$ is displayed, the image display apparatus 16 displays only the aerial image $V_1$ by operating such that the polarization separating element 18 allows transmission of only polarized light passing through the optical path for the aerial image $V_1$ and does not allow transmission of polarized light passing through the optical path for the non-floating image R. The aerial image display system 10m displays the superimposed image $V_2$ where the non-floating image R and the aerial image $V_1$ are superimposed on each other by displaying the non-floating image R and the aerial image $V_1$ by time-division or space-division.

In the example shown in FIGS. 17 to 20, the polarization separating element 18 is disposed on the visible side further than the half mirror 12 and the reflective polarizer.

Figure 21:
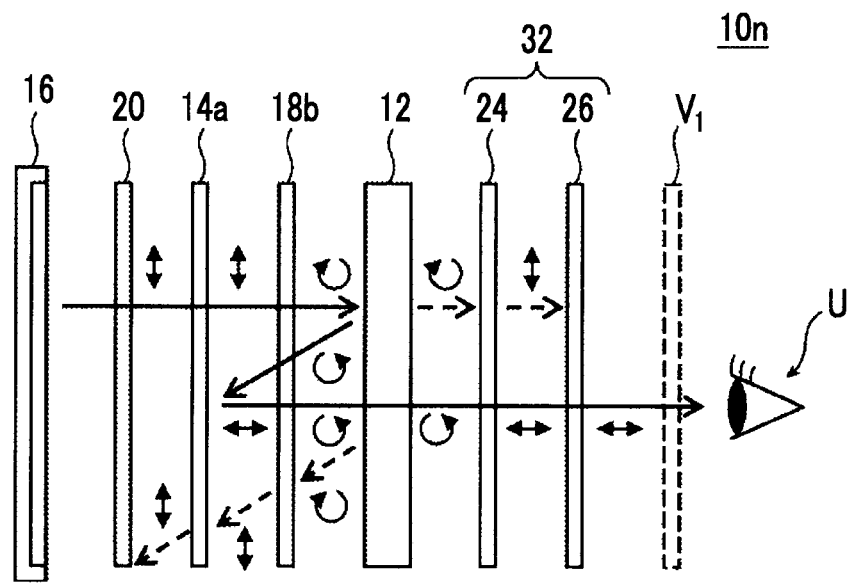
FIG. 21 is a diagram conceptually showing another example of the aerial image display system according to the present invention and showing a state where an aerial image is displayed.
Figure 22:
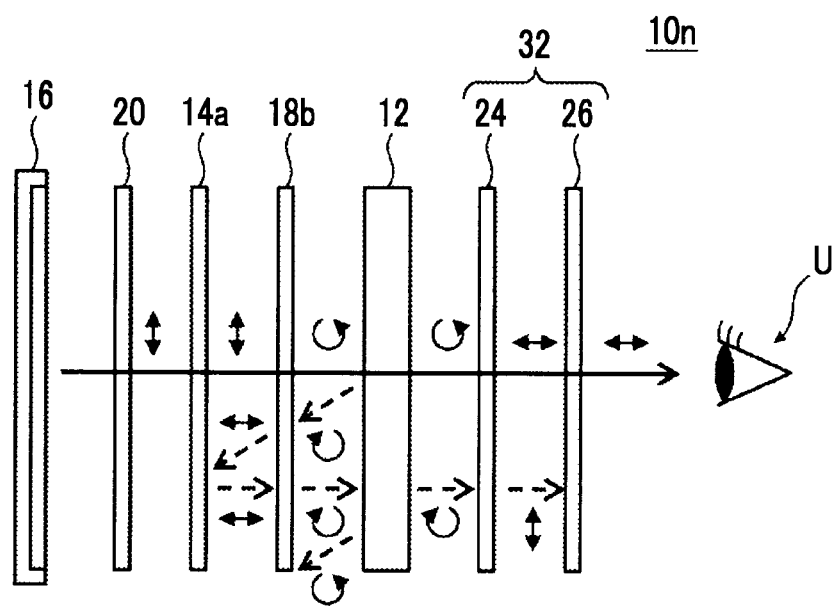
FIG. 22 is a diagram showing a state where the aerial image display system shown in FIG. 21 displays a non-floating image.

FIGS. 21 and 22 are diagrams conceptually showing another example of the aerial image display system according to the present invention. An aerial image display system 10n shown in FIGS. 21 and 22 includes a polarization separating element 18b that is formed of the active retardation layer or the patterned retardation layer.

The aerial image display system 10n shown in FIGS. 21 and 22 includes the image display apparatus 16, the absorptive linear polarizer 20, the reflective linear polarizer 14a, the polarization separating element 18b, and the half mirror 12. In addition, as a preferable aspect, the aerial image display system 10n includes the absorptive circular polarizer 32 that is provided on the visible side further than the half mirror 12.

In the example shown in FIG. 21, in the aerial image display system 10n, the timing at which the aerial image $V_1$ is displayed or the state of the region where the aerial image $V_1$ is displayed is shown.

An action of the aerial image display system 10n in the state will be described.

The image display apparatus 16 emits light for an image (aerial image). In this case, as described above, light is emitted from each of points (each of pixels) on the image display apparatus toward various directions. The light emitted from the image display apparatus 16 transmits through the absorptive linear polarizer 20 to be converted into linearly polarized light in one direction. In the example shown in the drawing, for example, the absorptive linear polarizer 20 allows transmission of linearly polarized light in an up-down direction in the drawing. Next, the linearly polarized light is incident into the reflective linear polarizer 14a. In the example shown in the drawing, the reflective linear polarizer 14a allows transmission of the linearly polarized light in the up-down direction. Therefore, the linearly polarized light incident into the reflective linear polarizer 14a transmits through the reflective linear polarizer 14a to be incident into the polarization separating element 18b without being reflected.

The polarization separating element 18b is the active retardation layer or the patterned retardation layer. Accordingly, the linearly polarized light incident into the polarization separating element 18b is converted into circularly polarized light by the polarization separating element 18b as the retardation layer. In the example shown in the drawing, for example, the polarization separating element 18b converts the linearly polarized light in the up-down direction into right circularly polarized light.

This right circularly polarized light is incident into the half mirror 12, and a part of the incident light transmits through the half mirror 12. The right circularly polarized light transmitted through the half mirror 12 is incident into the absorptive circular polarizer 32. In the example shown in the drawing, the absorptive circular polarizer 32 allows transmission of left circularly polarized light and absorbs right circularly polarized light. Therefore, the right circularly polarized light incident into the absorptive circular polarizer 32 is absorbed. Specifically, the absorptive circular polarizer 32 includes the retardation layer 24 and the absorptive linear polarizer 26, and the right circularly polarized light transmitted through the half mirror 12 is converted into linearly polarized light in the up-down direction by the retardation layer 24. The absorptive linear polarizer 26 absorbs the linearly polarized light in the up-down direction. Therefore, the linearly polarized light in the up-down direction is absorbed by the absorptive linear polarizer 26.

On the other hand, the remaining light of the right circularly polarized light incident into the half mirror 12 is reflected from the half mirror 12. In this case, the right circularly polarized light is converted into left circularly polarized light by reflection. In addition, the half mirror 12 is any one of a concave mirror, a Fresnel mirror, or a retroreflective member, and thus reflects light to collect the light.

The left circularly polarized light reflected from the half mirror 12 is incident into the polarization separating element 18b to be converted into linearly polarized light in the left-right direction.

The reflective linear polarizer 14a reflects the linearly polarized light in the left-right direction. Therefore, this linearly polarized light is reflected from the reflective linear polarizer 14a. The linearly polarized light in the left-right direction reflected from the reflective linear polarizer 14a is incident into the polarization separating element 18b, is converted into left circularly polarized light, and is incident into the half mirror 12.

This left circularly polarized light is incident into the half mirror 12, and a part of the incident light is reflected. In this case, the left circularly polarized light is converted into right circularly polarized light by reflection. The right circularly polarized light reflected from the half mirror 12 is incident into the polarization separating element 18b to be converted into linearly polarized light in the up-down direction. This linearly polarized light is a linearly polarized light in a direction orthogonal to that of the linearly polarized light reflected from the reflective linear polarizer 14a, transmits through the reflective linear polarizer 14a and the absorptive linear polarizer 20, and is absorbed by the surface or the like of the image display apparatus 16.

On the other hand, the remaining light of the left circularly polarized light incident into the half mirror 12 transmits through the half mirror 12. The left circularly polarized light transmitted through the half mirror 12 is incident into the absorptive circular polarizer 32. In the example shown in the drawing, the absorptive circular polarizer 32 allows transmission of left circularly polarized light and absorbs right circularly polarized light. Therefore, the left circularly polarized light incident into the absorptive circular polarizer 32 is emitted from the aerial image display system 10n. Specifically, the absorptive circular polarizer 32 includes the retardation layer 24 and the absorptive linear polarizer 26, and the left circularly polarized light transmitted through the half mirror 12 is converted into linearly polarized light in the left-right direction by the retardation layer 24. The absorptive linear polarizer 26 absorbs the linearly polarized light in the up-down direction. Therefore, the linearly polarized light in the left-right direction transmits through the absorptive linear polarizer 26.

As described above, in the aerial image display system 10n, only the light of the optical path for the aerial image $V_1$ is emitted to the user U side, and the image displayed by the image display apparatus 16 is prevented from being recognized as the non-floating image. As a result, the image displayed by the image display apparatus 16 can be displayed as the aerial image $V_1$.

In a preferable aspect, in the aerial image display system 10n, the absorption axis of the absorptive linear polarizer 20 and the absorption axis of the absorptive linear polarizer 26 are orthogonal to each other. In addition, the transmission axis of the reflective linear polarizer 14a and the transmission axis of the absorptive linear polarizer 20 are parallel to each other. Further, at the timing at which the aerial image $V_1$ is displayed or in the state of the region where the aerial image $V_1$, the slow axis of the polarization separating element 18b and the slow axis of the retardation layer 24 are orthogonal to each other.

In addition, it is preferable that the retardation of the polarization separating element 18b and the retardation of the retardation layer 24 match with each other. In addition, it is preferable that wavelength dispersibility of the polarization separating element 18b and wavelength dispersibility of the retardation layer 24 match with each other, and it is more preferable that both of the wavelength dispersibility of the polarization separating element 18b and the wavelength dispersibility of the retardation layer 24 are reverse dispersibility.

With the above-described configuration, stray light such as the right circularly polarized light component transmitted through the half mirror 12 can be further reduced, which is preferable.

On the other hand, in the example shown in FIG. 22, in the aerial image display system 10n, the timing at which the non-floating image R is displayed or the state of the region where the non-floating image R is displayed is shown.

An action of the aerial image display system 10n in the state will be described.

The image display apparatus 16 emits light for an image (non-floating image). In this case, as described above, light is emitted from each of points (each of pixels) on the image display apparatus toward various directions. The light emitted from the image display apparatus 16 transmits through the absorptive linear polarizer 20 to be converted into linearly polarized light in the up-down direction. Next, the linearly polarized light is incident into the reflective linear polarizer 14a. In the example shown in the drawing, the reflective linear polarizer 14a allows transmission of the linearly polarized light in the up-down direction. Therefore, the linearly polarized light incident into the reflective linear polarizer 14a transmits through the reflective linear polarizer 14a to be incident into the polarization separating element 18b without being reflected.

As described above, the polarization separating element 18b is the active retardation layer or the patterned retardation layer, in the state shown in FIG. 22, the direction of the slow axis in the polarization separating element 18b is different from the state shown in FIG. 21, and the linearly polarized light in the up-down direction transmitted through the polarization separating element 18b is converted into left circularly polarized light having a turning direction opposite to the state shown in FIG. 21.

This left circularly polarized light is incident into the half mirror 12, and a part of the incident light transmits through the half mirror 12. The left circularly polarized light transmitted through the half mirror 12 is incident into the absorptive circular polarizer 32. In the example shown in the drawing, the absorptive circular polarizer 32 allows transmission of left circularly polarized light and absorbs right circularly polarized light. Therefore, the left circularly polarized light incident into the absorptive circular polarizer 32 is emitted from the aerial image display system 10n. Specifically, the absorptive circular polarizer 32 includes the retardation layer 24 and the absorptive linear polarizer 26, and the left circularly polarized light transmitted through the half mirror 12 is converted into linearly polarized light in the left-right direction by the retardation layer 24. The absorptive linear polarizer 26 absorbs the linearly polarized light in the up-down direction. Therefore, the linearly polarized light in the left-right direction transmits through the absorptive linear polarizer 26.

On the other hand, the remaining light of the left circularly polarized light incident into the half mirror 12 is reflected from the half mirror 12. In this case, the left circularly polarized light is converted into right circularly polarized light by reflection.

The right circularly polarized light reflected from the half mirror 12 is incident into the polarization separating element 18b. The polarization separating element 18b converts the left circularly polarized light into linearly polarized light in the up-down direction. Therefore, the right circularly polarized light is converted into linearly polarized light in the left-right direction and is incident into the reflective linear polarizer 14a.

The reflective linear polarizer 14a reflects the linearly polarized light in the left-right direction. Therefore, this linearly polarized light is reflected from the reflective linear polarizer 14a. The linearly polarized light in the left-right direction reflected from the reflective linear polarizer 14a is incident into the polarization separating element 18b, is converted into right circularly polarized light, and is incident into the half mirror 12.

This right circularly polarized light is incident into the half mirror 12, and a part of the incident light is reflected. In this case, the right circularly polarized light is converted into left circularly polarized light by reflection. The left circularly polarized light reflected from the half mirror 12 is incident into the polarization separating element 18b to be converted into linearly polarized light in the up-down direction. This linearly polarized light is a linearly polarized light in a direction orthogonal to that of the linearly polarized light reflected from the reflective linear polarizer 14a, transmits through the reflective linear polarizer 14a and the absorptive linear polarizer 20, and is absorbed by the surface or the like of the image display apparatus 16.

On the other hand, the remaining light of the right circularly polarized light incident into the half mirror 12 transmits through the half mirror 12. The right circularly polarized light transmitted through the half mirror 12 is incident into the absorptive circular polarizer 32. In the example shown in the drawing, the absorptive circular polarizer 32 allows transmission of left circularly polarized light and absorbs right circularly polarized light. Therefore, the right circularly polarized light incident into the absorptive circular polarizer 32 is absorbed. Specifically, the absorptive circular polarizer 32 includes the retardation layer 24 and the absorptive linear polarizer 26, and the right circularly polarized light transmitted through the half mirror 12 is converted into linearly polarized light in the up-down direction by the retardation layer 24. The absorptive linear polarizer 26 absorbs the linearly polarized light in the up-down direction. Therefore, the linearly polarized light in the up-down direction is absorbed by the absorptive linear polarizer 26.

As described above, at the timing at which the aerial image display system 10n displays the non-floating image R or in the region where the aerial image display system 10n displays the non-floating image R, only the light of the optical path for the non-floating image R is emitted to the user U side, and the image displayed by the image display apparatus 16 is prevented from being recognized as the aerial image. As a result, in the image display apparatus 16, the image to be displayed as the non-floating image R can be prevented from being displayed as the aerial image, and only the non-floating image R can be displayed.

In the aerial image display system 10n, at the timing at which or in the region where the non-floating image R is displayed, the image display apparatus 16 displays only the non-floating image R by operating such that the polarization separating element 18b allows transmission of only polarized light passing through the optical path for the non-floating image R and does not allow transmission of polarized light passing through the optical path for the aerial image $V_1$, and at the timing at which or in the region where the aerial image $V_1$ is displayed, the image display apparatus 16 displays only the aerial image $V_1$ by operating such that the polarization separating element 18b allows transmission of only polarized light passing through the optical path for the aerial image $V_1$ and does not allow transmission of polarized light passing through the optical path for the non-floating image R. The aerial image display system $10n$ displays the superimposed image $V_2$ where the non-floating image R and the aerial image $V_1$ are superimposed on each other by displaying the non-floating image R and the aerial image $V_1$ by time-division or space-division.

In the example shown in FIGS. 17 to 22, the reflective polarizer is disposed on the image display apparatus side, and the half mirror is disposed on the visible side.

In the example shown in FIGS. 15, 16, 21, and 22, the polarization separating element 18 is disposed between the half mirror 12 and the reflective polarizer.

Next, the components of the aerial image display system will be described.
(Half Mirror)

The half mirror is any one of a concave mirror, a Fresnel mirror, or a retroreflective member that allows transmission of about half of incident light and reflects the remaining half of the incident light. That is, in the half mirror, a reflecting surface of the concave mirror, the Fresnel mirror, or the retroreflective member is a semi-transmissive and semi-reflective reflecting surface. The transmittance of the half mirror is preferably 50±30%, more preferably 50±10%, and most preferably 50%.

Figure 24:
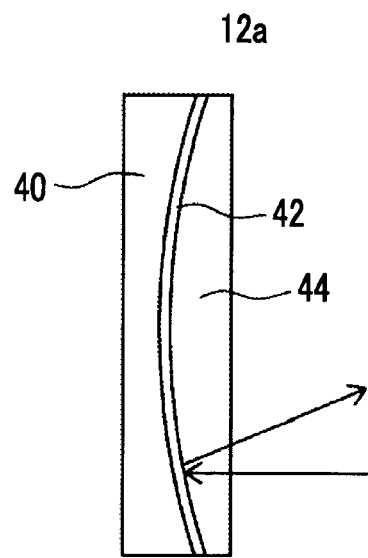
FIG. 24 is a diagram conceptually showing an example of a half mirror.

FIG. 24 is a diagram showing a cross-section of one example of the half mirror that is the concave mirror.

A half mirror 12a shown in FIG. 24 includes: a transparent support 40 that has a concave surface; a reflecting surface 42 that is formed on the concave surface of the support 40; and a coating layer 44 that is laminated on a surface of the reflecting surface 42 opposite to the support 40.

The support 40 is formed of a transparent resin such as polyethylene terephthalate (PET), a cycloolefin polymer (COP), or polymethyl methacrylate (PMMA), glass, or the like, in which one surface (concave surface) has a concave portion obtained by cutting out a part of a spherical surface or a paraboloidal surface.

A material, a forming method, and the like of the reflecting surface 42 are the same as those of a reflecting surface of a general half mirror. For example, the reflecting surface 42 can be formed on the concave surface of the support 40 by vapor deposition or the like of a metal such as silver or aluminum. The thickness is preferably 1 to 20 nm, more preferably 2 to 10 nm, and still more preferably 3 to 6 nm.

The half mirror 12a allows transmission of half of incident light and reflects half of the incident light, and the reflecting surface 42 is formed in a concave surface shape. As a result, the half mirror 12a has a function of collecting reflected light.

In addition, in a preferable aspect, the half mirror 12a in the example shown in the drawing includes the coating layer 44 that is laminated on a surface of the reflecting surface 42 opposite to the support 40. It is preferable that the coating layer 44 is transparent. In addition, it is preferable that the coating layer 44 is formed of a material having substantially the same refractive index as the support 40. Further, it is preferable that a surface of the support 40 opposite to the reflecting surface 42 and a surface of the coating layer 44 opposite to the reflecting surface 42 are flat surfaces parallel to each other.

In a case where the coating layer 44 is not provided, light transmitted through the half mirror 12a is bent due to the influence of the concave surface of the support 40. Therefore, an image of the light transmitted through the half mirror 12a undergoes an enlargement or reduction action.

On the other hand, the half mirror 12a includes the coating layer 44 having substantially the same refractive index as the support 40, and the surfaces of the support 40 and the coating layer 44 are flat surfaces parallel to each other. As a result, light transmitted through the half mirror 12a can be prevented from being bent due to the influence of the concave surface of the support 40, and an image of the light transmitted through the half mirror 12a can be prevented from undergoing the enlargement or reduction action. As a result, in the aerial image display system according to the embodiment of the present invention, the non-floating image and/or the aerial image can be prevented from being enlarged or reduced or from being distorted.

The refractive index of the support 40 and the refractive index of the coating layer 44 do not need to be exactly the same as long as the above-described effect can be obtained, and may have a difference within a range where the effect can be obtained. The difference between the refractive index of the support 40 and the refractive index of the coating layer 44 is preferably 0.1 or less, more preferably 0.05 or less, and still more preferably 0.01 or less.

Figure 25:
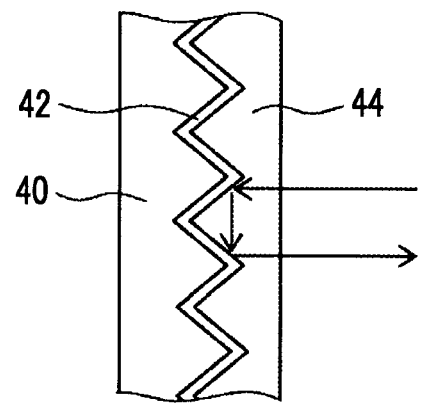
FIG. 25 is a diagram conceptually showing another example of the half mirror.

FIG. 25 is a diagram showing a cross-section of one example of the half mirror that is the retroreflective member.

A half mirror 12b shown in FIG. 25 includes: the transparent support 40 having a surface on which a corner cube array is formed; the reflecting surface 42 that is formed on the corner cube array of the support 40; and the coating layer 44 that is laminated on a surface of the reflecting surface 42 opposite to the support 40.

Figure 26:
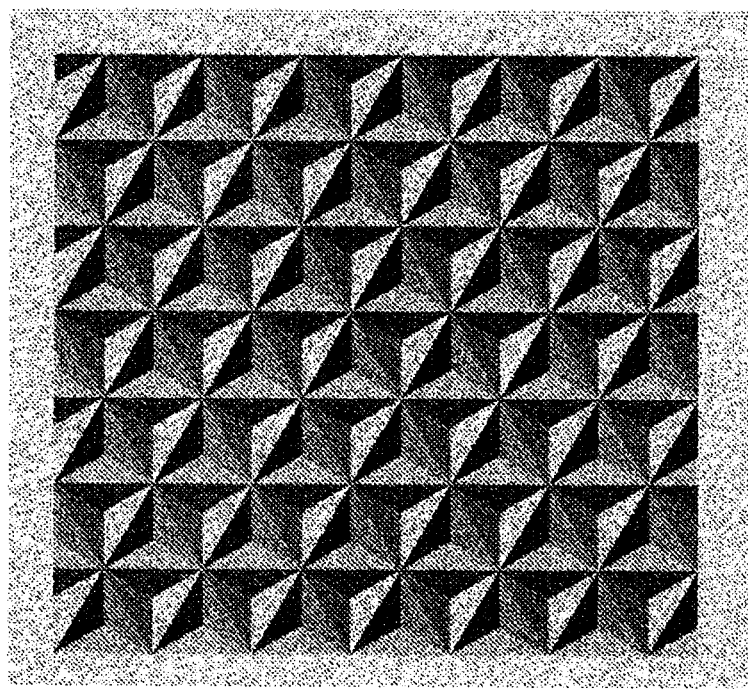
FIG. 26 is a plan view conceptually showing one example of a corner cube array.
Figure 27:
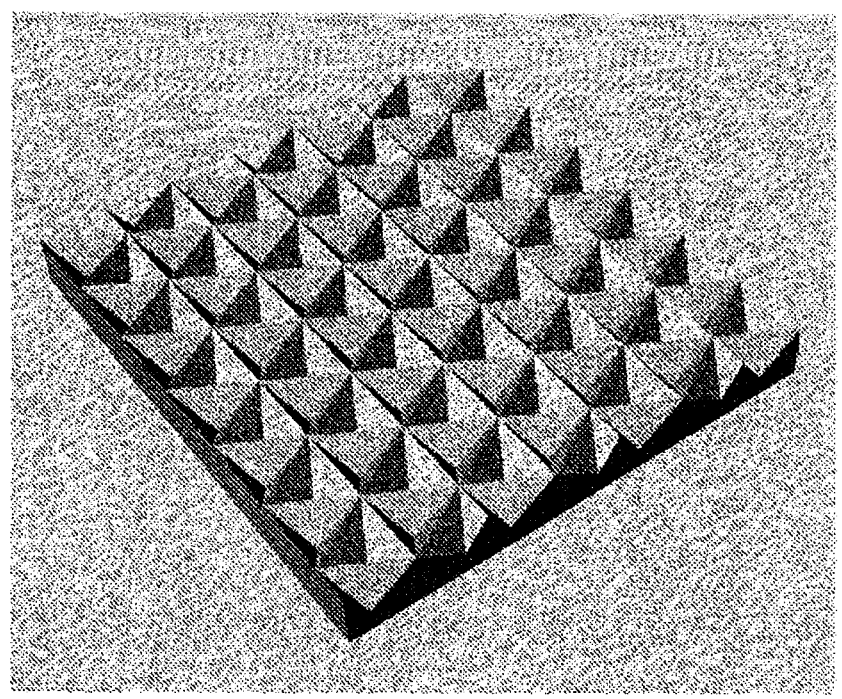
FIG. 27 is a perspective view conceptually showing one example of the corner cube array.

FIG. 26 is a plan view showing one example of the corner cube array, and FIG. 27 is a perspective view showing the example of the corner cube array.

As shown in FIGS. 26 and 27, the corner cube array is a structure in which a plurality of three-sided mirrors (also called corner cube prisms) where mirrors of three surfaces are orthogonal to each other are arranged on a plane. Regarding the size of one three-sided mirror, it is preferable that the length of one side is less than 1 mm from the viewpoint of improving the resolution of the aerial image. Light incident into one three-sided mirror of the corner cube array is reflected from each of the three reflecting surfaces and is emitted in a direction opposite to the incidence direction. That is, the light is retroreflected.

The support 40 is formed of a transparent resin such as polyethylene terephthalate (PET), a cycloolefin polymer (COP), or polymethyl methacrylate (PMMA), glass, or the like, and includes a well-known corner cube array as the retroreflective member.

A material, a forming method, and the like of the reflecting surface 42 are the same as those of a reflecting surface of a general half mirror. For example, the reflecting surface 42 can be formed on the surface of the support 40 where the corner cube array is formed by vapor deposition or the like of a metal such as silver or aluminum. The thickness is preferably 1 to 20 nm, more preferably 2 to 10 nm, and still more preferably 3 to 6 nm.

The half mirror 12b allows transmission of half of incident light and reflects half of the incident light, and the reflecting surface 42 is formed on the corner cube array. As a result, the half mirror 12b has a function of retroreflecting reflected light.

In addition, in a preferable aspect, the half mirror 12b in the example shown in the drawing also includes the coating layer 44 that is laminated on a surface of the reflecting surface 42 opposite to the support 40. It is preferable that the coating layer is transparent, and the difference between the refractive index of the support 40 and the refractive index of the coating layer 44 is preferably 0.1 or less, more preferably 0.05 or less, and still more preferably 0.01 or less.

In the example shown in the drawing, the half mirror 12b is the half mirror of the retroreflective member that is formed of the corner cube array. However, the present invention is not limited to this example. In the glass bead type retroreflective member, the reflecting surface may be a semi-transmissive and semi-reflective reflecting surface.

Figure 28:
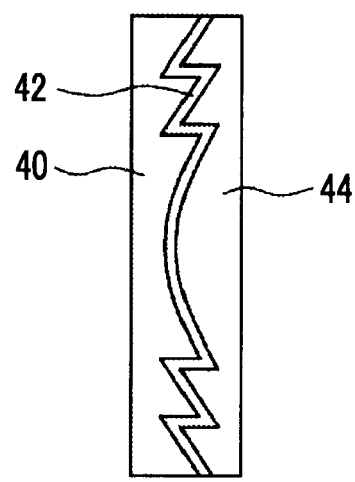
FIG. 28 is a diagram conceptually showing another example of the half mirror.

FIG. 28 is a cross-sectional view showing an example of the half mirror as the Fresnel mirror.

A half mirror 12c shown in FIG. 28 includes: the transparent support 40 where a groove having a Fresnel lens shape; the reflecting surface 42 that is formed on the surface of the support 40 where the Fresnel lens is formed; and the coating layer 44 that is laminated on a surface of the reflecting surface 42 opposite to the support 40.

The support 40 is formed of a transparent resin such as polyethylene terephthalate (PET), a cycloolefin polymer (COP), or polymethyl methacrylate (PMMA), glass, or the like, in which one surface has a well-known Fresnel lens shape.

A material, a forming method, and the like of the reflecting surface 42 are the same as those of a reflecting surface of a general half mirror. For example, the reflecting surface 42 can be formed on the surface of the support 40 where the groove having a Fresnel lens shape is formed by vapor deposition or the like of a metal such as silver or aluminum. The thickness is preferably 1 to 20 nm, more preferably 2 to 10 nm, and still more preferably 3 to 6 nm.

The half mirror 12c allows transmission of half of incident light and reflects half of the incident light, and the reflecting surface 42 is formed in a Fresnel mirror shape. As a result, the half mirror 12c has a function of collecting reflected light due to the same action of the concave mirror.

In addition, in a preferable aspect, the half mirror 12c in the example shown in the drawing also includes the coating layer 44 that is laminated on a surface of the reflecting surface 42 opposite to the support 40. It is preferable that the coating layer is transparent, and the difference between the refractive index of the support 40 and the refractive index of the coating layer 44 is preferably 0.1 or less, more preferably 0.05 or less, and still more preferably 0.01 or less.

(Reflective Polarizer)

The reflective polarizer is not particularly limited, and various reflective polarizers can be used.

The reflective polarizer is basically a reflective linear polarizer or a reflective circular polarizer.

The reflective linear polarizer is a polarizer that allows transmission of linearly polarized light in one direction and reflects linearly polarized light in a direction orthogonal to the linearly polarized light.

Examples of the reflective linear polarizer include a film obtained by stretching a dielectric multi-layer film described in JP2011-053705A and a wire grid polarizer described in JP2015-028656A. In addition, as the reflective linear polarizer, a commercially available product can be suitably used. Examples of the reflective linear polarizer as the commercially available product include a reflective polarizer (trade name: APF) manufactured by 3M and a wire grid polarizer (trade name: WGF) manufactured by Asahi Kasei Corporation.

The reflective circular polarizer is a polarizer that allows transmission of right circularly polarized light and left circularly polarized light and reflects circularly polarized light having a turning direction opposite to that of the transmitted circularly polarized light.

Examples of the reflective circular polarizer include a reflective circular polarizer including a cholesteric liquid crystal layer. The cholesteric liquid crystal layer is a liquid crystal layer obtained by immobilizing a cholesterically aligned liquid crystal phase (cholesteric liquid crystalline phase).

As is well known, the cholesteric liquid crystal layer has a helical structure in which the liquid crystal compound is helically turned and laminated. In the helical structure, a configuration in which the liquid crystal compound is helically rotated once (rotated by 360°) and laminated is set as one helical pitch (helical pitch), and plural pitches of the helically turned liquid crystal compounds are laminated.

The cholesteric liquid crystal layer reflects left circularly polarized light or right circularly polarized light in a specific wavelength range and allows transmission of the other light depending on the length of the helical pitch and the helical turning direction (sense) of the liquid crystal compound.

Accordingly, in a case where the aerial image display system displays a color image, the reflective circular polarizer may include, for example, a plurality of cholesteric liquid crystal layers including a cholesteric liquid crystal layer that has a central wavelength of selective reflection for red light, a cholesteric liquid crystal layer that has a central wavelength of selective reflection for green light, and a cholesteric liquid crystal layer that has a central wavelength of selective reflection for blue light.

(Polarization Separating Element)

The polarization separating element is an element that has a function of separating at least a part of the incident light into polarized light components orthogonal to each other. For example, the polarization separating element separates the incident light into right circularly polarized light and left circularly polarized light or into linearly polarized light components having orthogonal to each other.

As described above, it is preferable that the polarization separating element includes any one of an active retardation layer, a patterned retardation layer, an active polarizer, or a patterned polarizer.

The active retardation layer is a retardation layer that is capable of switching a direction of a slow axis or a size of retardation.

As the active retardation layer capable of switching a direction of a slow axis, various well-known retardation layers can be used. Examples of the active retardation layer include an active retardation layer that is capable of switching a voltage to be applied to switch a direction of a slow axis (optical axis of a liquid crystal compound) to a direction orthogonal to the direction using a liquid crystal cell that acts as a ¼ wave plate, for example, as in an active shutter stereoscopic image display apparatus.

In addition, as the active retardation layer that is capable of switching a size of retardation, various well-known retardation layers can be used. Examples of the active retardation layer include an active retardation layer that is capable of switching a voltage to be applied to switch between, for example, a state where the retardation is zero and a state where the retardation is ½ wavelength using a liquid crystal cell such as a vertical alignment (VA) type.

In the present invention, the ¼ wave plate (¼ wave retardation plate) is a retardation plate having a retardation of about ¼ wavelength at any wavelength of visible light.

As the ¼ wave plate, for example, at a wavelength of 550 nm, a ¼ wave plate having a retardation of 120 nm to 150 nm is preferable, and a ¼ wave plate having a retardation of 130 nm to 140 nm is more preferable.

The patterned retardation layer includes a plurality of regions having different directions of slow axes and/or different sizes of retardation.

Examples of the patterned retardation layer having different directions of slow axes include a patterned retardation layer that is a ¼ wave plate and is divided into regions in a stripe shape and where directions of slow axes in adjacent regions are orthogonal to each other. In addition, examples of the patterned retardation layer having different sizes of retardation include a patterned retardation layer that is divided into regions in a stripe shape and where a region having a retardation of ¼ wavelength and a region having a retardation of ¾ wavelength are alternately formed.

The patterned retardation layer may be prepared using a well-known method such as a method described in JP2012-008170A, a method described in JP2012-032661A, or the like. In addition, as the patterned retardation layer, a commercially available product can also be used.

In the above-described example, the active retardation layer capable of switching a direction of a slow axis and the patterned retardation layer that includes a plurality of regions having different directions of slow axes are described as representative examples. However, even an active retardation layer that is capable of switching a size of retardation and a patterned retardation layer that includes a plurality of regions having different sizes of retardation can exhibit the same effects.

The active polarizer is a polarizer that is capable of switching a direction of a transmission axis or an absorption axis. The active polarizer switches, for example, a direction of absorption axis (transmission axis) between two directions orthogonal to each other.

As the active polarizer, various well-known polarizers can be used. Examples of the active polarizer include an active polarizer that changes an alignment direction of a dichroic coloring agent as described in JP2019-70781A by interposing a guest-host liquid crystal layer having a dichroic coloring agent between a pair of opposing electrode layers and applying a voltage thereto.

The patterned polarizer is a polarizer that includes a plurality of regions having different directions of transmission axes or absorption axes. Examples of the patterned polarizer include a patterned retardation layer that is divided into regions in a stripe shape and where directions of transmission axes (absorption axes) in adjacent regions are orthogonal to each other.

As the patterned polarizer, for example, a patterned retardation layer various well-known polarizers such as a patterned polarizer that includes two or more regions having different directions of absorption axes as described in JP2009-193014A can be used.

In the patterned retardation layer and the patterned polarizer, the pattern of the regions is not limited to a stripe shape.

As the pattern that can be used in the patterned retardation layer, for example, a checkered pattern can also be used in addition to a stripe pattern.

As described above, in the aerial image display system according to the embodiment of the present invention, in a case where the polarization separating element includes the active retardation layer or the active polarizer, the image display apparatus alternately displays the non-floating image R (the image for the non-floating image R) and the aerial image $V_1$ (the image for the aerial image $V_1$) by time-division.

In other words, in a case where the polarization separating element includes the active retardation layer or the active polarizer, in a case where the image display apparatus displays the non-floating image R, the polarization separating element switches the direction of the slow axis or the transmission axis (absorption axis) such that the optical path of the non-floating image R is obtained. In addition, in a case where the image display apparatus displays the aerial image $V_1$, the polarization separating element switches the direction of the slow axis or the transmission axis such that the optical path of the aerial image $V_1$ is obtained.

On the other hand, in a case where the polarization separating element is the patterned retardation layer or the patterned polarizer, the image display apparatus arranges and displays the non-floating image R (the image for the non-floating image R) and the aerial image $V_1$ (the image for the aerial image $V_1$) by dividing the images (space-division) depending on the pattern of the polarization separating element.

For example, in a case where the pattern of the polarization separating element is stripe-shaped and the regions where the slow axes or the transmission axes are orthogonal to each other are alternately arranged, the image display apparatus divides (space-division) the image for the non-floating image R and the image for the aerial image $V_1$ in a stripe shape. In addition, the image display apparatus displays the divided non-floating image R corresponding to the region where the direction of the slow axis or the transmission axis of the polarization separating element 18 is the optical path of the non-floating image R, and displays the divided aerial image $V_1$ corresponding to the region where the direction of the slow axis or the transmission axis of the polarization separating element 18 is the optical path of the aerial image $V_1$.

Here, in FIGS. 7 to 10 and 15 to 22, regarding the absorptive linear polarizer 20 that is disposed adjacent to the image display apparatus 16, in a case where the image display apparatus 16 is an apparatus including a linear polarizer, for example, an OLED including an antireflection film that includes a liquid crystal display device and an absorptive linear polarizer, the linear polarizer in the image display apparatus may be used as the absorptive linear polarizer 20.

In addition, in the description of the examples shown in FIGS. 11 to 14 and 17 to 20, in the polarization separating element 18, the absorptive linear polarizer 28 is a typical linear polarizer and the retardation layer 30 is the active retardation layer or the patterned retardation layer. However, the retardation layer 30 may be a typical retardation layer and the absorptive linear polarizer 28 may be the active polarizer or the patterned polarizer.

Even in this configuration, likewise, in the aerial image display system, at the timing at which or in the region where the non-floating image R is displayed, the image display apparatus 16 displays only the non-floating image R by operating such that the polarization separating element 18 allows transmission of only polarized light passing through the optical path for the non-floating image R and cuts polarized light passing through the optical path for the aerial image $V_1$, and at the timing at which or in the region where the aerial image $V_1$ is displayed, the image display apparatus 16 displays only the aerial image $V_1$ by operating such that the polarization separating element 18 allows transmission of only polarized light passing through the optical path for the aerial image $V_1$ and cuts polarized light passing through the optical path for the non-floating image R. The aerial image display system can display the superimposed image $V_2$ where the non-floating image R and the aerial image $V_1$ are superimposed on each other by displaying the non-floating image R and the aerial image $V_1$ by time-division or space-division.

In the liquid crystal display device, typically, two linear polarizers are provided in a crossed nicols state in a state where a liquid crystal cell is interposed between the linear polarizers. Accordingly, in the configuration where the polarization separating element 18 is disposed between the image display apparatus and the half mirror 12 as in the example shown in FIGS. 11 to 14, in a case where the liquid crystal display device is used as the image display apparatus and the active polarizer or the patterned polarizer is used, not only the polarizer on the emission side but also the polarizer on the side backlight light is incident need to change to the active polarizer or the patterned polarizer.

In consideration of this point, in the configuration where the active polarizer is used and the configuration where the patterned polarizer is used, it is advantageous to use a display device other than a liquid crystal display device as the image display apparatus, for example, to use an OLED as the image display apparatus.

In the aerial image display system according to the embodiment of the present invention, a position where the aerial image $V_1$ is displayed, that is, a floating distance of the aerial image $V_1$ can be adjusted by changing a separation distance between the image display apparatus and the half mirror, between the image display apparatus and the reflective polarizer, or between the half mirror and the reflective polarizer. Specifically, by increasing any one of the distances, the floating distance of the aerial image $V_1$ can be increased.

In addition, in a configuration where the polarization separating element and the image display apparatus are spaced from each other with the half mirror interposed therebetween as in the example shown in FIGS. 15 to 20, in a case where the patterned retardation layer or the patterned polarizer used as the polarization separating element, crosstalk of images is likely to occur, and the image quality is likely to decrease.

Accordingly, in the configuration where the image display apparatus and the polarization separating element are spaced from each other with the half mirror interposed therebetween, it is preferable to use the active retardation layer or the active polarizer as the polarization separating element 18.

[Input System]

By using the aerial image display system according to the embodiment of the present invention in combination with a noncontact touch sensor, an input system can be obtained.

Figure 23:
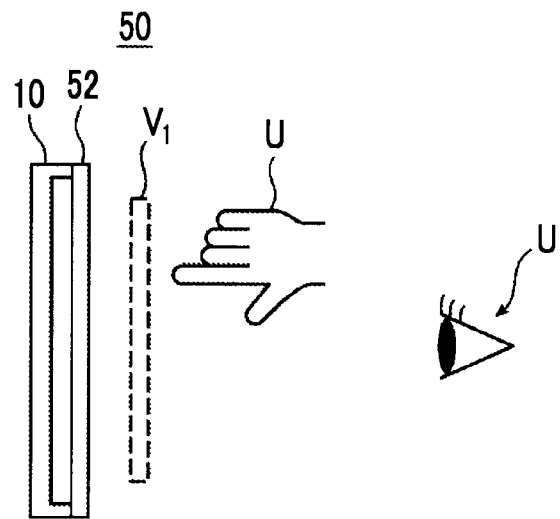
FIG. 23 is a diagram conceptually showing an input system including the aerial image display system according to the present invention.

Specifically, as shown in FIG. 23, in the configuration where an input system 50 includes the aerial image display system 10 and a noncontact touch sensor 52 disposed on a display surface side of the aerial image display system 10, the aerial image $V_1$ displayed by the aerial image display system 10 is displayed on a space where the noncontact touch sensor 52 determines whether or not an input is received. As a result, in a case where a touch operation is performed in the air through the noncontact touch sensor 52, the air where the input determination is performed can be recognized by the aerial image $V_1$, and thus the operation can be more easily performed. For example, the user U touches the space where the aerial image $V_1$ is displayed with a finger such that the touch operation by the noncontact touch sensor 52 can be performed.

In a case where the aerial image display system is used in this input system, the aerial image display system that displays only the aerial image $V_1$ and does not display non-floating image R as shown in FIGS. 7 to 10 may be used, the aerial image display system that superimposes different images as the aerial image $V_1$ and the non-floating image R on each other to display the superimposed image as shown in FIGS. 11 to 22 may be used, or the aerial image display system that displays the same image as the non-floating image and the aerial image as in the example shown in FIG. 2 may be used.

As the noncontact touch sensor, a well-known noncontact touch sensor such as a noncontact infrared touch sensor that identifies an object by emitting infrared light and detecting the reflected infrared light, a noncontact capacitive touch sensor, a time-of-flight (TOF) sensor, a LIDAR sensor, or a noncontact touch sensor that images a finger or the like with one or a plurality of cameras to detect a touch position can be used.

In the example shown in FIG. 23, the noncontact touch sensor 52 is disposed on the display surface side of the aerial image display system 10, but the present invention is not limited thereto. Depending on the type of the noncontact touch sensor 52, the noncontact touch sensor 52 may be disposed on the peripheral (bezel) portion of the aerial image display system 10. For example, in a case where the noncontact capacitive touch sensor or the like is used, it is preferable that the noncontact touch sensor 52 is disposed on the display surface side of the aerial image display system 10. On the other hand, in a case where the TOF sensor, the LIDAR sensor, or the like is used, it is preferable that the noncontact touch sensor 52 is disposed on the peripheral (bezel) portion of the aerial image display system 10.

Hereinabove, the aerial image display system and the input system according to the embodiment of the present invention have been described above. However, the present invention is not limited to the above-described examples, and various improvements and modifications can be made within a range not departing from the scope of the present invention.

The present invention can be suitably used in a car navigation system, an input system, or the like.

EXPLANATION OF REFERENCES 10, 10a to 10n: aerial image display system
12, 12a to 12c: half mirror
14: reflective polarizer
14a: reflective linear polarizer
14b: reflective circular polarizer
16: image display apparatus
18, 18b: polarization separating element
20, 26: absorptive linear polarizer
22, 24: retardation plate
28: absorptive linear polarizer
30: retardation plate
32: absorptive circular polarizer
40: support
42: reflecting surface
44: coating layer
52: noncontact touch sensor
R: non-floating image
$V_1$: aerial image
$V_2$: superimposed image
U: user
O: object

What is claimed is:
1. An aerial image display system comprising:
a reflective polarizer;
a half mirror;

an image display apparatus; and
a polarization separating element that has a function of separating incident light into polarized light components orthogonal to each other,
wherein the half mirror is any one of a concave mirror, a Fresnel mirror, or a retroreflective member of a semi-transmissive and semi-reflective type,
the reflective polarizer and the half mirror are disposed on a visible side of the image display apparatus, and
the polarization separating element includes any one of an active retardation layer that is capable of switching a direction of a slow axis or a size of retardation, a patterned retardation layer that includes a plurality of two kinds of regions different in at least one of a direction of a slow axis or a size of retardation, an active polarizer that is capable of switching a direction of a transmission axis or an absorption axis, or a patterned polarizer that includes a plurality of two kinds of regions having different directions of transmission axes or absorption axes.

2. The aerial image display system according to claim 1, wherein the reflective polarizer is a reflective linear polarizer,
the aerial image display system further comprises a retardation plate, and
the image display apparatus, the polarization separating element, the half mirror, the retardation plate, and the reflective polarizer are disposed in this order.

3. The aerial image display system according to claim 1, wherein the reflective polarizer is a reflective circular polarizer, and
the image display apparatus, the polarization separating element, the half mirror, and the reflective polarizer are disposed in this order.

4. The aerial image display system according to claim 1, wherein the reflective polarizer is a reflective linear polarizer,
the aerial image display system further comprises an absorptive linear polarizer and a retardation plate, and
the image display apparatus, the absorptive linear polarizer, the retardation plate, the half mirror, the polarization separating element, and the reflective polarizer are disposed in this order.

5. The aerial image display system according to claim 1, wherein the reflective polarizer is a reflective linear polarizer,
the aerial image display system further comprises an absorptive linear polarizer and a retardation plate, and
the image display apparatus, the absorptive linear polarizer, the reflective polarizer, the retardation plate, the half mirror, and the polarization separating element are disposed in this order.

6. The aerial image display system according to claim 1, wherein the reflective polarizer is a reflective circular polarizer,
the aerial image display system further comprises an absorptive linear polarizer and a retardation plate, and
the image display apparatus, the absorptive linear polarizer, the retardation plate, the reflective polarizer, the half mirror, and the polarization separating element are disposed in this order.

7. The aerial image display system according to claim 1, wherein the reflective polarizer is a reflective linear polarizer,
the aerial image display system further comprises an absorptive linear polarizer, and
the image display apparatus, the absorptive linear polarizer, the reflective polarizer, the polarization separating element, and the half mirror are disposed in this order.

8. The aerial image display system according to claim 1, wherein the reflective polarizer is a reflective linear polarizer,
the aerial image display system further comprises an absorptive linear polarizer and two retardation plates, and
the image display apparatus, the absorptive linear polarizer, the retardation plate, the half mirror, the retardation plate, and the reflective polarizer are disposed in this order.

9. The aerial image display system according to claim 2, further comprising an absorptive linear polarizer that is provided on a visible side further than the reflective polarizer.

10. The aerial image display system according to claim 3, further comprising an absorptive circular polarizer that is provided on a visible side.

11. The aerial image display system according to claim 1, wherein the half mirror includes a support and a reflecting surface disposed on a surface of the support,
a coating layer having the same refractive index as the support is disposed on the reflecting surface, and
a surface of the support opposite to the reflecting surface and a surface of the coating layer opposite to the reflecting surface are flat surfaces parallel to each other.

12. An input system comprising:
the aerial image display system according to claim 1; and
a noncontact touch sensor.

13. An aerial image display system comprising:
a reflective polarizer;
a half mirror; and
an image display apparatus,
wherein the half mirror is any one of a concave mirror, a Fresnel mirror, or a retroreflective member of a semi-transmissive and semi-reflective type,
the reflective polarizer is a reflective circular polarizer,
the reflective circular polarizer including a cholesteric liquid crystal layer,
the aerial image display system further comprises an absorptive linear polarizer and a retardation plate, and
the image display apparatus, the absorptive linear polarizer, the retardation plate, the half mirror, and the reflective polarizer are disposed in this order.

14. An aerial image display system comprising:
a reflective polarizer;
a half mirror; and
an image display apparatus,
wherein the half mirror is any one of a concave mirror, a Fresnel mirror, or a retroreflective member of a semi-transmissive and semi-reflective type,
the reflective polarizer is a reflective linear polarizer,
the aerial image display system further comprises an absorptive linear polarizer and a retardation plate, and
the image display apparatus, the absorptive linear polarizer, the reflective polarizer, the retardation plate, and the half mirror are disposed in this order.

15. An aerial image display system comprising:
a reflective polarizer;
a half mirror; and
an image display apparatus,
wherein the half mirror is any one of a concave mirror, a Fresnel mirror, or a retroreflective member of a semi-transmissive and semi-reflective type,
the reflective polarizer is a reflective circular polarizer, the aerial image display system further comprises an absorptive linear polarizer and a retardation plate, and the image display apparatus, the absorptive linear polarizer, the retardation plate, the reflective polarizer, and the half mirror are disposed in this order.

* * * * *